United States Patent
Kasahara et al.

(10) Patent No.: US 11,850,558 B2
(45) Date of Patent: Dec. 26, 2023

(54) COMPOSITION USEFUL FOR PRODUCING ACIDIC GAS SEPARATION MEMBRANE

(71) Applicant: Sumitomo Chemical Company, Limited, Tokyo (JP)

(72) Inventors: Shohei Kasahara, Osaka (JP); Kosuke Makiguchi, Osaka (JP); Taigo Kashiwabara, Osaka (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 334 days.

(21) Appl. No.: 17/275,802

(22) PCT Filed: Sep. 12, 2019

(86) PCT No.: PCT/JP2019/035803
§ 371 (c)(1),
(2) Date: Mar. 12, 2021

(87) PCT Pub. No.: WO2020/054791
PCT Pub. Date: Mar. 19, 2020

(65) Prior Publication Data
US 2022/0047996 A1    Feb. 17, 2022

(30) Foreign Application Priority Data
Sep. 14, 2018 (JP) .................. 2018-172248

(51) Int. Cl.
*B01D 53/22* (2006.01)
*B01D 71/82* (2006.01)
(Continued)

(52) U.S. Cl.
CPC .......... *B01D 71/82* (2013.01); *B01D 53/228* (2013.01); *B01D 67/0079* (2013.01);
(Continued)

(58) Field of Classification Search
CPC ............ B01D 67/0088; B01D 2325/02; B01D 67/0079; B01D 71/82; B01D 2325/20;
(Continued)

(56) References Cited

U.S. PATENT DOCUMENTS

2003/0134100 A1* 7/2003 Mao ........................ A61L 27/56
428/304.4
2004/0030282 A1* 2/2004 Freyman ............. A61M 5/1582
604/44
(Continued)

FOREIGN PATENT DOCUMENTS

EP   2 664 373 A1   11/2013
JP   2011-161387 A   8/2011
(Continued)

*Primary Examiner* — Anthony R Shumate
(74) *Attorney, Agent, or Firm* — Foley & Lardner LLP

(57) ABSTRACT

The present invention provides a composition containing the following components (A)-(C): (A) an alkali metal compound, (B) a polymer having an acidic dissociative group, and (C) a compound having an acidic dissociative group and an amino group, and having β of more than 0.0 and less than 1.0 as calculated by the formula (I): β={amount (mol) of alkali metal in component (A)−amount (mol) of acidic dissociative group in component (B)}/amount (mol) of acidic dissociative group in component (C).

13 Claims, 9 Drawing Sheets

(51) Int. Cl.
  *B01D 67/00* (2006.01)
  *B01D 69/12* (2006.01)
  *B01D 71/02* (2006.01)
(52) U.S. Cl.
  CPC ......... *B01D 67/0088* (2013.01); *B01D 69/12* (2013.01); *B01D 71/02* (2013.01); *B01D 2053/223* (2013.01); *B01D 2325/02* (2013.01); *B01D 2325/20* (2013.01)
(58) Field of Classification Search
  CPC .................. B01D 53/228; B01D 71/02; B01D 2053/223; B01D 69/12
  See application file for complete search history.

(56) References Cited

U.S. PATENT DOCUMENTS

| | | | | |
|---|---|---|---|---|
| 2004/0060125 | A1* | 4/2004 | Audouset | A61K 8/4926 |
| | | | | 8/405 |
| 2007/0095256 | A1* | 5/2007 | Miyagawa | C04B 24/165 |
| | | | | 106/823 |
| 2010/0023101 | A1* | 1/2010 | Wallace | C08K 5/0008 |
| | | | | 600/372 |
| 2010/0173228 | A1* | 7/2010 | Wallace | H01M 4/8673 |
| | | | | 977/734 |
| 2012/0077901 | A1* | 3/2012 | Tanaka | A61K 6/889 |
| | | | | 523/116 |
| 2012/0297976 | A1 | 11/2012 | Sano | |
| 2014/0352540 | A1 | 12/2014 | Okada et al. | |
| 2017/0020964 | A1* | 1/2017 | Conejo-Garcia | A61K 31/4458 |
| 2020/0225128 | A1* | 7/2020 | Goldsborough | G01N 1/30 |
| 2021/0231538 | A1* | 7/2021 | Goldsborough | C12M 45/06 |
| 2021/0305572 | A1* | 9/2021 | Baba | H01M 4/60 |
| 2022/0176011 | A1* | 6/2022 | Heber-Katz | A61L 17/005 |
| 2022/0403295 | A1* | 12/2022 | Hueffer | C11D 11/0023 |

FOREIGN PATENT DOCUMENTS

| | | |
|---|---|---|
| JP | 2012-205971 A | 10/2012 |
| JP | 2013-049048 A | 3/2013 |
| JP | 2015-027654 A | 2/2015 |
| JP | 2015-036129 A | 2/2015 |
| WO | WO-2014/050226 A1 | 4/2014 |

* cited by examiner

COMPOSITION USEFUL FOR PRODUCING ACIDIC GAS SEPARATION MEMBRANE

CROSS-REFERENCE TO RELATED APPLICATIONS

This application is the U.S. National Stage of PCT/JP2019/035803, filed Sep. 12, 2019, which claims priority to JP 2018-172248, filed Sep. 14, 2018.

TECHNICAL FIELD

The present invention relates to a composition useful for producing an acidic gas separation membrane.

BACKGROUND ART

An acidic gas membrane separation process is attracting attention in recent years because it can realize energy saving as a process for separating an acidic gas (e.g., carbon dioxide) from synthetic gases synthesized in large-scale plants such as hydrogen production, urea production and the like, natural gas, exhaust gas and the like. Various acidic gas separation membranes for the acidic gas membrane separation process are being studied.

For example, patent document 1 describes a carbon dioxide gas separation membrane constituted of a porous membrane and a resin composition containing an alkali metal gas carrier for carbon dioxide gas and an amine carrier for carbon dioxide gas. In addition, patent document 2 describes a facilitated transport membrane for $CO_2$ constituted of a porous membrane and a gel layer (hydrogel membrane) containing glycine and a deprotonation agent.

DOCUMENT LIST

Patent Documents patent document 1: JP-A-2015-36129
patent document 2: JP-A-2013-49048

SUMMARY OF INVENTION

Technical Problem

For efficient separation of an acidic gas by using an acidic gas separation membrane, it is effective to increase the partial pressure difference of acidic gas between a surface side of an acidic gas separation membrane that feeds acidic gas (feed side), and a surface side of an acidic gas separation membrane that issues a permeated acidic gas (permeate side).

To increase the partial pressure difference of acidic gas between the feed side and the permeate side, the present inventors studied sweeping the permeate side with an inert gas, or reducing the pressure on the permeate side. As the results thereof, the present inventors have found that sweeping with an inert gas or pressure reduction on the permeate side causes a decrease in the acidic gas/nonacidic gas separation factor obtained by using conventional acidic gas separation membranes. The cause thereof is assumed to be decreased humidity on the permeate side due to the sweeping with an inert gas or the pressure reduction. However, the present invention is not affected by such assumption.

The present invention has been made in view of the above-mentioned situation, and aims to provide a composition capable of producing an acidic gas separation membrane that can achieve a high acidic gas/nonacidic gas separation factor even when sweeping with an inert gas or pressure reduction is performed on the permeate side.

Solution to Problem

The present invention capable of achieving the above-mentioned object is as described below.

[1] A composition comprising the following components (A)-(C):
(A) an alkali metal compound,
(B) a polymer having an acidic dissociative group, and
(C) a compound having an acidic dissociative group and an amino group, and having β of more than 0.0 and less than 1.0 as calculated by the following formula (I):

$$\beta = \{\text{amount (mol) of alkali metal in component } (A) - \text{amount (mol) of acidic dissociative group in component } (B)\}/\text{amount (mol) of acidic dissociative group in component } (C) \quad (I).$$

[2] The composition of the aforementioned [1], wherein said β is not less than 0.05, more preferably not less than 0.10, further preferably not less than 0.15, particularly preferably not less than 0.20.
[3] The composition of the aforementioned [1] or [2], wherein said β is not more than 0.90, more preferably not more than 0.80, further preferably not more than 0.70, particularly preferably not more than 0.60, most preferably not more than 0.50.
[4] The composition of any one of the aforementioned [1] to [3], wherein said component (A) is at least one selected from the group consisting of an alkali metal carbonate, an alkali metal hydrogen carbonate and an alkali metal hydroxide, more preferably an alkali metal hydroxide, further preferably at least one selected from the group consisting of potassium hydroxide, rubidium hydroxide and cesium hydroxide, particularly preferably cesium hydroxide.
[5] The composition of any one of the aforementioned [1] to [4], wherein an amount of said component (A) is more than 1.0 mol and not more than 10 mol, more preferably not more than 5.0 mol, further preferably mol not more than 3.0, per 1 mol of the acidic dissociative group in component (B).
[6] The composition of any one of the aforementioned [1] to [5], wherein said component (B) comprises a water-absorbing crosslinked polymer having an acidic dissociative group.
[7] The composition of the aforementioned [6], wherein the water-absorbing crosslinked polymer having an acidic dissociative group is an acrylic acid-based water-absorbing crosslinked polymer having a carboxy group, more preferably a chemically crosslinked polyacrylic acid having a carboxy group.
[8] The composition of the aforementioned [6] or [7], wherein a 0.2 wt % aqueous solution of the water-absorbing crosslinked polymer having an acidic dissociative group has a viscosity of 500-50,000 mPa·s, more preferably 800-45,000 mPa·s, further preferably 1,000-40,000 mPa·s.
[9] The composition of any one of the aforementioned [6] to [8], wherein said component (B) comprises a non-crosslinked polymer having an acidic dissociative group.
[10] The composition of the aforementioned [9], wherein the non-crosslinked polymer having an acidic dissociative group is an acrylic acid-based non-crosslinked polymer having a carboxy group, more preferably a non-crosslinked polyacrylic acid having a carboxy group.
[11] The composition of the aforementioned [9] or [10], wherein a 0.2 wt % aqueous solution of the non-crosslinked polymer having an acidic dissociative group has a viscosity of 100-1,500 mPa·s, more preferably 150-1,200 mPa·s, further preferably 200-1,000 mPa·s.

[12] The composition of any one of the aforementioned [9] to [11], wherein an amount of the non-crosslinked polymer having an acidic dissociative group is 1-99 wt %, more preferably 2-90 wt %, further preferably 2-80 wt %, of the total amount of the water-absorbing crosslinked polymer having an acidic dissociative group in component (B) and the aforementioned non-crosslinked polymer in component (B).

[13] The composition of any one of the aforementioned [1] to [12], wherein an amount of component (B) in a solid content in the composition is 5.0-90 wt %, more preferably 7.0-60 wt %, further preferably 10-30 wt %.

[14] The composition of any one of the aforementioned [1] to [13], wherein said component (C) is a compound having a carboxy group and an amino group, more preferably an amino acid having only a secondary amino group as the amino group, further preferably proline and/or sarcosine, particularly preferably proline or sarcosine.

[15] The composition of any one of the aforementioned [1] to [14], wherein an amount of said component (C) is 0.5-10 mol, more preferably 0.7-7.0 mol, further preferably 1.0-5.0 mol, per 1 mol of the acidic dissociative group in component (B).

[16] The composition of any one of the aforementioned [1] to [15], wherein the composition is used to produce an acidic gas separation membrane.

[17] An acidic gas separation membrane comprising the composition of any one of the aforementioned [1] to [16].

[18] An acidic gas separation membrane element comprising the acidic gas separation membrane of the aforementioned [17].

[19] The acidic gas separation membrane element of the aforementioned [18], comprising a laminated body comprising the acidic gas separation membrane and at least one of a feed-side flow path member and a permeate-side flow path member, and a hollow tube with plural holes formed on a wall, and having a structure wherein the laminated body is wound around the hollow tube.

[20] An acidic gas separation membrane module comprising the acidic gas separation membrane element of the aforementioned [18] or [19].

[21] The acidic gas separation membrane module of the aforementioned [20], comprising at least one acidic gas separation membrane element, a mixed gas-feed part for feeding a mixed gas to the acidic gas separation membrane, a retentate gas-exhaust part for exhausting a retentate gas that did not pass through the acidic gas separation membrane, and a permeate gas-exhaust part for exhausting a permeate gas that passed through the acidic gas separation membrane.

[22] An acidic gas separation apparatus comprising at least one acidic gas separation membrane module of the aforementioned [20] or [21].

[23] The acidic gas separation apparatus of the aforementioned [22], further comprising at least one of a means of reducing the pressure of the permeate gas, and a means of supplying a sweep gas that is exhausted together with the permeate gas, wherein the means of reducing the pressure of the permeate gas communicates with a permeate gas-exhaust part of the acidic gas separation membrane module, and the means of supplying a sweep gas communicates with a sweep gas-supply part of the acidic gas separation membrane module.

[24] A method for producing an acidic gas separation membrane comprising a step of preparing a coating liquid by mixing the following components (A)-(C):

(A) an alkali metal compound,
(B) a polymer having an acidic dissociative group, and
(C) a compound having an acidic dissociative group and an amino group, and
a medium, a step of applying the coating liquid on a porous layer to form a film of the coating liquid, and a step of removing the medium from the film of the coating liquid, wherein $\beta$ as calculated by the following formula (I):

$$\beta=\{\text{amount (mol) of alkali metal in component } (A) - \text{amount (mol) of acidic dissociative group in component } (B)\}/\text{amount (mol) of acidic dissociative group in component } (C) \quad (I)$$

is more than 0.0 and less than 1.0.

[25] The method of the aforementioned [24], wherein said $\beta$ is not less than 0.05, more preferably not less than 0.10, further preferably not less than 0.15, particularly preferably not less than 0.20.

[26] The method of the aforementioned [24] or [25], wherein said $\beta$ is not more than 0.90, more preferably not more than 0.80, further preferably not more than 0.70, particularly preferably not more than 0.60, most preferably not more than 0.50.

[27] The method of any one of the aforementioned [24] to [26], wherein said component (A) is at least one selected from the group consisting of an alkali metal carbonate, an alkali metal hydrogen carbonate and an alkali metal hydroxide, more preferably an alkali metal hydroxide, further preferably at least one selected from the group consisting of potassium hydroxide, rubidium hydroxide and cesium hydroxide, particularly preferably cesium hydroxide.

[28] The method of any one of the aforementioned [24] to [27], wherein an amount of said component (A) is more than 1.0 mol and not more than 10 mol, more preferably not more than 5.0 mol, further preferably mol not more than 3.0, per 1 mol of the acidic dissociative group in component (B).

[29] The method of any one of the aforementioned [24] to [28], wherein said component (B) comprises a water-absorbing crosslinked polymer having an acidic dissociative group.

[30] The method of the aforementioned [29], wherein the water-absorbing crosslinked polymer having an acidic dissociative group is an acrylic acid-based water-absorbing crosslinked polymer having a carboxy group, more preferably a chemically crosslinked polyacrylic acid having a carboxy group.

[31] The method of the aforementioned [29] or [30], wherein a 0.2 wt % aqueous solution of the water-absorbing crosslinked polymer having an acidic dissociative group has a viscosity of 500-50,000 mPa·s, more preferably 800-45,000 mPa·s, further preferably 1,000-40,000 mPa·s.

[32] The method of any one of the aforementioned [29] to [31], wherein said component (B) comprises a non-crosslinked polymer having an acidic dissociative group.

[33] The method of the aforementioned [32], wherein the non-crosslinked polymer having an acidic dissociative group is an acrylic acid-based non-crosslinked polymer having a carboxy group, more preferably a non-crosslinked polyacrylic acid having a carboxy group.

[34] The method of the aforementioned [32] or [33], wherein a 0.2 wt % aqueous solution of the non-crosslinked polymer having an acidic dissociative group has a viscosity of 100-1,500 mPa·s, more preferably 150-1,200 mPa·s, further preferably 200-1,000 mPa·s.

[35] The method of any one of the aforementioned [32] to [34], wherein an amount of the non-crosslinked polymer having an acidic dissociative group is 1-99 wt %, more preferably 2-90 wt %, further preferably 2-80 wt %, of the total amount of the water-absorbing crosslinked polymer having an acidic dissociative group in component (B) and the aforementioned non-crosslinked polymer in component (B).

[36] The method of any one of the aforementioned [24] to [35], wherein an amount of component (B) in a solid content in the coating liquid is 5.0-90 wt %, more preferably 7.0-60 wt %, further preferably 10-30 wt %.

[37] The method of any one of the aforementioned [24] to [36], wherein said component (C) is a compound having a carboxy group and an amino group, more preferably an amino acid having only a secondary amino group as the amino group, further preferably proline and/or sarcosine, particularly preferably proline or sarcosine.

[38] The method of any one of the aforementioned [24] to [37], wherein an amount of said component (C) is 0.5-10 mol, more preferably 0.7-7.0 mol, further preferably 1.0-5.0 mol, per 1 mol of the acidic dissociative group in component (B).

Advantageous Effects of Invention

An acidic gas separation membrane that can achieve a high acidic gas/nonacidic gas separation factor even when sweeping with an inert gas or pressure reduction is performed on the permeate side can be produced from the composition of the present invention.

DESCRIPTION OF EMBODIMENTS

Figure 1:
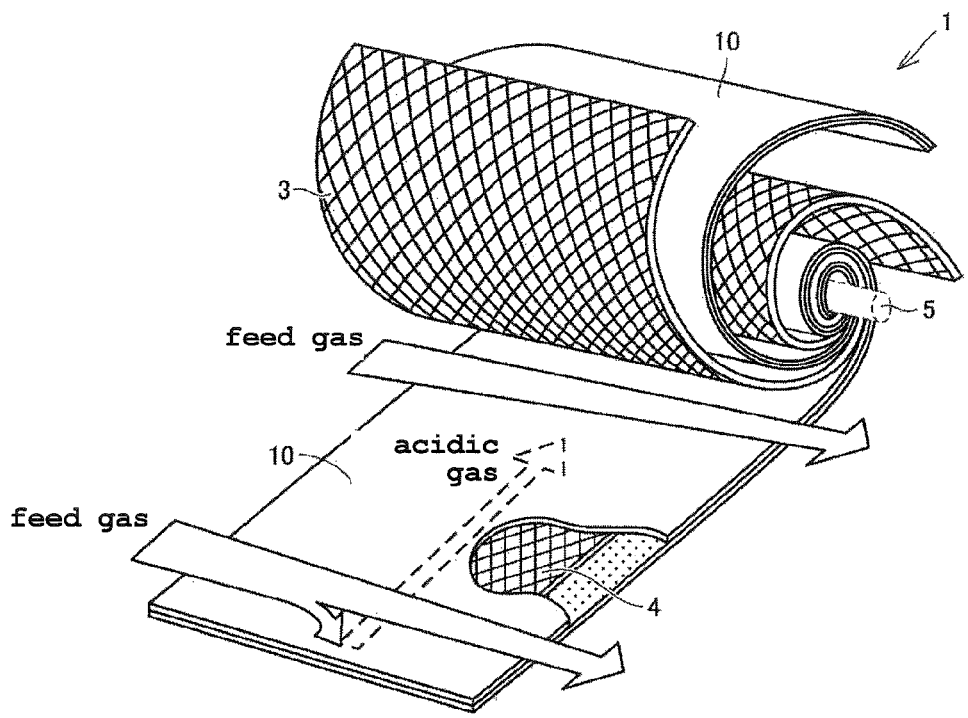
FIG. 1 is a schematic perspective view provided with a partial notch which expands and shows one embodiment of the acidic gas separation membrane element of the present invention.

The present invention is sequentially described in the following. The examples, preferred embodiments, and the like described in the present specification can be combined as long as they do not contradict each other.

<Composition>

The composition of the present invention is characterized in that it contains the following components (A)-(C):
(A) an alkali metal compound,
(B) a polymer having an acidic dissociative group, and
(C) a compound having an acidic dissociative group and an amino group, and
has $\beta$ of more than 0.0 and less than 1.0 as calculated by the following formula (I):

$$\beta = \{\text{amount (mol) of alkali metal in component } (A) - \text{amount (mol) of acidic dissociative group in component } (B)\} / \text{amount (mol) of acidic dissociative group in component } (C) \qquad (I).$$

The combined use of the aforementioned components (A)-(C) in amounts making $\beta$ more than 0.0 and less than 1.0 makes it possible to produce an acidic gas separation membrane that can achieve high acidic gas/nonacidic gas separation factor even when sweeping with an inert gas or pressure reduction is performed on the permeate side. The $\beta$ is preferably not less than 0.05, more preferably not less than 0.10, further preferably not less than 0.15, particularly preferably not less than 0.20, and preferably not more than 0.90, more preferably not more than 0.80, further preferably not more than 0.70, particularly preferably not more than 0.60, most preferably not more than 0.50.

In the present invention, only one kind or two or more kinds of components (A)-(C) may be used. These are sequentially described in the following.

<Component (A)>

The component (A) is an alkali metal compound. Examples of the alkali metal compound include alkali metal carbonate, alkali metal hydrogen carbonate, alkali metal hydroxide and the like.

Examples of the alkali metal carbonate include sodium carbonate, lithium carbonate, potassium carbonate, rubidium carbonate, and cesium carbonate. Only one kind or two or more kinds of alkali metal carbonate may be used. Alkali metal carbonate is preferably at least one selected from the group consisting of potassium carbonate, rubidium carbonate and cesium carbonate, more preferably cesium carbonate.

Examples of the alkali metal hydrogen carbonate include sodium hydrogen carbonate, lithium hydrogen carbonate, potassium hydrogen carbonate, rubidium hydrogen carbonate, and cesium hydrogen carbonate. Only one kind or two or more kinds of alkali metal hydrogen carbonate may be used. Alkali metal hydrogen carbonate is preferably at least one selected from the group consisting of potassium hydrogen carbonate, rubidium hydrogen carbonate and cesium hydrogen carbonate, more preferably cesium hydrogen carbonate.

Examples of the alkali metal hydroxide include sodium hydroxide, lithium hydroxide, potassium hydroxide, rubidium hydroxide, and cesium hydroxide. Only one kind or two or more kinds of alkali metal hydroxide may be used. Alkali metal hydroxide is preferably at least one selected from the group consisting of potassium hydroxide, rubidium hydroxide and cesium hydroxide, more preferably cesium hydroxide.

The component (A) is (i) preferably at least one selected from the group consisting of an alkali metal carbonate, an alkali metal hydrogen carbonate and an alkali metal hydroxide, (ii) more preferably alkali metal hydroxide, (iii) further preferably at least one selected from the group consisting of potassium hydroxide, rubidium hydroxide and cesium hydroxide, (iv) particularly preferably cesium hydroxide.

The amount of component (A)(alkali metal compound) is preferably more than 1.0 mol, preferably not more than 10 mol, more preferably not more than 5.0 mol, further preferably not more than 3.0 mol, per 1 mol of the acidic dissociative group in component (B)(polymer having an acidic dissociative group).

<Component (B)>

The component (B) is a polymer having an acidic dissociative group. In the present specification, the "acidic dissociative group" means an acidic functional group that can release proton ($H^+$) in a medium. Examples of the monovalent acidic dissociative group include carboxy group (—COOH), sulfo group (—S(O)$_2$(OH)), and phenolic hydroxyl group, and examples of the divalent acidic dissociative group include phosphono group (—P(O)(OH)$_2$), and phosphono oxy group (—O—P(O)(OH)$_2$). The aforementioned polymer may have only one kind or two or more kinds of acidic dissociative groups. The acidic dissociative group is preferably a monovalent acidic dissociative group, more preferably a carboxy group.

As an index of the size of component (B), the viscosity of a 0.2 wt % aqueous solution thereof (when component (B) is a crosslinked polymer and is not strictly soluble in water, viscosity of 0.2 wt % dispersion) can be mentioned. The viscosity of a 0.2 wt % aqueous solution (viscosity of 0.2 wt % dispersion) of component (B) is preferably 300-70,000 mPa·s, more preferably 400-50,000 mPa·s, further preferably 500-40,000 mPa·s. The viscosity is a value measured using a B-type viscometer under conditions of pH 7, temperature 25° C. and rotating speed 20 rpm.

The amount of component (B) in the solid content of the composition is preferably 5.0-90 wt %, more preferably 7.0-60 wt %, further preferably 10-30 wt %, from the aspects of easy formation and acidic gas permeability of the membrane. The solid content of the composition here mean a total of the components other than the medium.

The component (B) preferably contains a water-absorbing crosslinked polymer having an acidic dissociative group. In the present specification, the "water-absorbing crosslinked polymer" is a polymer capable of forming a hydrogel by either chemical crosslinking or physical crosslinking, or both. The "chemical crosslinking" means crosslinking by a covalent bond (excluding coordinate bond). The "physical crosslinking" means crosslinking by a noncovalent bond (e.g., hydrogen bond, ionic bond, coordinate bond). Only one kind or two or more kinds of a water-absorbing crosslinked polymer having an acidic dissociative group may be used. The explanation of the acidic dissociative group is as mentioned above.

Examples of the water-absorbing crosslinked polymer having an acidic dissociative group include acrylic acid-based water-absorbing crosslinked polymer, acrylamide-based water-absorbing crosslinked polymer, vinyl alcohol-based water-absorbing crosslinked polymer, ethylene oxide-based water-absorbing crosslinked polymer, sulfonic acid-based water-absorbing crosslinked polymer, aspartic acid-based water-absorbing crosslinked polymer, glutamic acid-based water-absorbing crosslinked polymer, alginate salt-based water-absorbing crosslinked polymer, starch-based water-absorbing crosslinked polymer, and cellulose-based water-absorbing crosslinked polymer.

The water-absorbing crosslinked polymer having an acidic dissociative group is preferably an acrylic acid-based water-absorbing crosslinked polymer having a carboxy group, etc. As used herein, the acrylic acid-based water-absorbing crosslinked polymer means a water-absorbing crosslinked polymer having constitutional units derived from acrylic acid.

The acrylic acid-based water-absorbing crosslinked polymer having a carboxy group optionally further has other acidic dissociative group different from a carboxy group. Examples of other acidic dissociative group include sulfo group, phosphono group, and phosphono oxy group. Such other acidic dissociative group can be introduced into a water-absorbing crosslinked polymer by polymerizing a monomer having the group together with the aforementioned acrylic acid, and the like, or adding a monomer or polymer having other acidic dissociative group to a water-absorbing crosslinked polymer obtained by polymerization.

Preferable examples of the acrylic acid-based water-absorbing crosslinked polymer having a carboxy group include a chemically crosslinked polyacrylic acid having a carboxy group. As used herein, the "chemically crosslinked polyacrylic acid" means a polymer having constitutional units derived from acrylic acid and a crosslinking structure by a covalent bond, and capable of forming a hydrogel by chemical crosslinking (i.e., crosslinking by covalent bond). In addition, the crosslinking structure by a covalent bond may be constituted of a constitutional unit derived from a crosslinkable monomer or a crosslinking agent.

Examples of the crosslinkable monomer which is one of the materials of chemically crosslinked polyacrylic acid include 1,3-butylene glycol di(meth)acrylate, 1,4-butanediol di(meth)acrylate, 1,6-hexanediol di(meth)acrylate, neopentylglycol di(meth)acrylate, ethylene glycol di(meth)acrylate, diethylene glycol di(meth)acrylate, triethylene glycol di(meth)acrylate, tetraethylene glycol di(meth)acrylate, propylene glycol di(meth)acrylate, dipropylene glycol di(meth)acrylate, tripropylene glycol di(meth)acrylate, trimethylolpropane tri(meth)acrylate, pentaerythritol tetra(meth)acrylate, dipentaerythritol penta(meth)acrylate, pentaerythritol tetraallylether and the like.

Examples of the chemically crosslinked polyacrylic acid include "AQUPEC (registered trade mark)" available from Sumitomo Seika Chemicals Company, Limited, and "SANFRESH (registered trade mark)" available from Sanyo Chemical Industries, Ltd.

An acrylic acid-based water-absorbing crosslinked polymer having a carboxy group may contain, in addition to the constitutional units derived from acrylic acid, constitutional as units derived from at least one kind selected from the group consisting of methacrylic acid, maleic acid, fumaric acid, crotonic acid and salts thereof, vinyl alcohol, acrylamide, and methacrylamide (hereinafter sometimes to be abbreviated as "other constitutional units").

In the present specification, the "constitutional unit derived from vinyl alcohol" means a unit having a structure formed by reaction of a double bond of vinyl alcohol, and may not be formed from the vinyl alcohol itself. The "constitutional unit derived from vinyl alcohol" is generally formed by polymerizing vinyl acetate and hydrolyzing a constitutional unit derived from vinyl acetate. In addition, the "constitutional unit derived from acrylic acid" and the like also mean the same. When an acrylic acid-based water-so absorbing crosslinked polymer having a carboxy group contains other constitutional units, the water-absorbing crosslinked polymer may be any of a random copolymer, an alternating copolymer, a block copolymer and a graft copolymer.

Among the copolymers having other constitutional units, a polyacrylic acid-poly(vinyl alcohol) copolymer capable of forming a hydrogel by physical crosslinking, and a polyacrylamide-polyacrylic acid copolymer capable of forming a hydrogel by chemical crosslinking are preferable. Examples of the aforementioned copolymers include a sodium salt of poly(vinyl alcohol)-polyacrylic acid copolymer "trade name: KURASTOMER AP20" available from Kuraray Co., Ltd., a potassium salt of polyacrylamide-polyacrylic acid copolymer of "product number 432776" available from Sigma-Aldrich Co. LLC., and the like.

As an index of the size of the water-absorbing crosslinked polymer having an acidic dissociative group, the viscosity of a 0.2 wt % aqueous solution thereof can be mentioned. The viscosity of a 0.2 wt % aqueous solution is preferably 500-50,000 mPa·s, more preferably 800-45,000 mPa·s, further preferably 1,000-40,000 mPa·s. The viscosity is a value measured by a B-type viscometer under the conditions of pH 7, temperature 25° C. and rotating speed 20 rpm.

The component (B) preferably contains a non-crosslinked polymer in addition to a water-absorbing crosslinked polymer having an acidic dissociative group. Only one kind or two or more kinds of the non-crosslinked polymer may be used. In the following, the non-crosslinked polymer is sometimes to be abbreviated simply as a "polymer". The non-crosslinked polymer may have an acidic dissociative group. The explanation of the acidic dissociative group is as mentioned above.

The non-crosslinked polymer having an acidic dissociative group is preferably an acrylic acid-based polymer having a carboxy group. The acrylic acid-based polymer having a carboxy group may further have other acidic dissociative group different from a carboxy group. Examples of other acidic dissociative group include sulfo group, phosphono group, and phosphono oxy group. Such other acidic dissociative group can be introduced into an acrylic acid-based polymer by polymerizing a monomer having the group together with the aforementioned acrylic acid and/or a salt thereof, or adding a monomer or polymer having other acidic dissociative group to the obtained acrylic acid-based polymer.

The acrylic acid-based polymer having a carboxy group may contain, in addition to the constitutional units derived from acrylic acid and/or a salt thereof, constitutional units derived from at least one kind selected from the group consisting of methacrylic acid, maleic acid, fumaric acid, crotonic acid and salts thereof, vinyl alcohol, acrylamide, and methacrylamide (hereinafter sometimes to be abbreviated as "other constitutional units").

The non-crosslinked polymer having an acidic dissociative group is more preferably a non-crosslinked polyacrylic acid having a carboxy group.

The viscosity of a 0.2 wt % aqueous solution of the non-crosslinked polymer having an acidic dissociative group is preferably 100-1,500 mPa·s, more preferably 150-1,200 mPa·s, further preferably 200-1,000 mPa·s. The viscosity is a value measured by a B-type viscometer under the conditions of pH 7, temperature 25° C. and rotating speed 20 rpm.

The component (B) consists of (i) preferably a water-absorbing crosslinked polymer having an acidic dissociative group, or a water-absorbing crosslinked polymer having an acidic dissociative group and a non-crosslinked polymer having an acidic dissociative group, (ii) more preferably a water-absorbing crosslinked polymer having an acidic dissociative group and a non-crosslinked polymer having an acidic dissociative group. In this embodiment, the water-absorbing crosslinked polymer having an acidic dissociative group is preferably an acrylic acid-based water-absorbing crosslinked polymer having a carboxy group, more preferably a chemically crosslinked polyacrylic acid having a carboxy group. In this embodiment, the non-crosslinked polymer having an acidic dissociative group is preferably an acrylic acid-based non-crosslinked polymer having a carboxy group, more preferably a non-crosslinked polyacrylic acid having a carboxy group.

When a non-crosslinked polymer having an acidic dissociative group is used, the amount thereof in component (B) is preferably 1-99 wt %, more preferably 2-90 wt %, further preferably 2-80 wt %, of the total amount of the water-absorbing crosslinked polymer having an acidic dissociative group in component (B) and the aforementioned non-crosslinked polymer in component (B), from the aspects of the improvement of the membrane-forming performance of the composition of the present invention.

<Component (C)>

The component (C) is a compound having an acidic dissociative group and an amino group. The explanation of the acidic dissociative group is as mentioned above. The component (C) may have only one kind or two or more kinds of the acidic dissociative group. The component (C) may be a compound having plural and different kinds of acidic dissociative groups in a molecule (e.g., hydroxyphenylglycine). The amino group may be any of primary amino group, secondary amino group, and tertiary amino group. The secondary amino group and tertiary amino group may also be heterocyclic amino groups in which a nitrogen atom of the amino group is one of the nitrogen-containing heterocycle constituent atoms.

Examples of the compound having an acidic dissociative group and an amino group include a compound having a carboxy group and an amino group, a compound having a compound having a sulfo group and an amino group (e.g., 2-aminoethanesulfonic acid), a compound having a phosphono group ($-P(O)(OH)_2$) and an amino group compound (e.g., 2-aminoethanephosphonic acid, NTMP (nitrilotris(methylenephosphonic acid)), and EDTMP (ethylenediamine tetra(methylene phosphonic acid)) and the like. Among these, a compound having a carboxy group and an amino group is preferable. That is, component (C) is preferably a compound having a carboxy group and amino group. Only one kind or two or more kinds of the compound having a carboxy group and amino group may be used.

Examples of the compound having a carboxy group and an amino group include, in addition to the below-mentioned general amino acids, EDTA (ethylenediaminetetraacetic acid), NTA (nitrilotriacetic acid), DTPA (diethylenetriaminepentaacetic acid), HEDTA (hydroxyethylethylenediaminetriacetic acid), TTHA (triethylenetetraminehexaacetic acid), PDTA (1,3-propanediaminetetraacetic acid), HIDA (hydroxyethyliminodiacetic acid), IDA (iminodiacetic acid), DHEG (dihydroxyethylglycine), GEDTA (glycol etherdiaminetetraacetic acid), and CMGA (dicarboxymethylglutamic acid), which are widely known as chelating materials, and the like. These compounds are commercially available as chelating materials.

Examples of the amino acid having only a primary amino group as the amino group include alanine, aspartic acid, cysteine, glutamine, glutamic acid, glycine, isoleucine, leucine, lysine, methionine, phenylalanine, serine, threonine, tyrosine, valine and the like.

Examples of the amino acid having only a secondary amino group as the amino group include proline, hydroxyproline, sarcosine and the like.

Examples of the amino acid having only a tertiary amino group as the amino group include dimethylglycine and the like.

Examples of the amino acid having a primary amino group and a secondary amino group as the amino groups include arginine, tryptophan and the like.

Examples of the amino acid having a primary amino group, a secondary amino group and a tertiary amino group as the amino groups include histidine and the like.

The component (C) is more preferably an amino acid having only a secondary amino group as the amino group, further preferably proline and/or sarcosine, particularly preferably proline or sarcosine, from the aspect of reactivity with an acidic gas.

The amount of component (C)(compound having an acidic dissociative group and an amino group) is preferably 0.5-10 mol, more preferably 0.7-7.0 mol, further preferably 1.0-5.0 mol, per 1 mol of the acidic dissociative group in component (B)(polymer having an acidic dissociative group).

<Other Component>

The composition of the present invention may contain other component different from components (A)-(C) as long as the effect of the present invention is not inhibited.

The composition of the present invention preferably contains a medium. The composition containing a medium may have flowability (e.g., coating liquid), or free of flowability (e.g., membrane composed of the composition of the present invention in acidic gas separation membranes (sometimes to be abbreviated as "composition membrane" in the present specification)).

Examples of the medium include protic polar solvents such as water, alcohol (e.g., methanol, ethanol, 1-propanol, 2-propanol) and the like; nonpolar solvents such as toluene, xylene, hexane and the like; aprotic polar solvents such as ketone solvent (e.g., acetone, methyl ethyl ketone, methyl isobutyl ketone), tetrahydrofuran, dioxane, N-methylpyrrolidone, N,N-dimethylacetamide, N,N-dimethylformamide and the like; and the like. Only one kind or two or more kinds of media may be used. As the medium, a medium containing at least one selected from the group consisting of water and alcohol is preferable, a medium containing at least one selected from the group consisting of water, methanol, ethanol, 1-propanol and 2-propanol is more preferable, and a medium containing water is more preferable.

The composition of the present invention may contain a surfactant. The surfactant may be any of a cationic surfactant, a nonionic surfactant, an anionic surfactant, and an amphoteric surfactant. Examples of the surfactant include polyoxyethylene alkyl phenyl ether, polyoxyethylene alkyl ether, fluorochemical surfactant, silicone surfactant and the like. Only one kind or two or more kinds of the surfactant may be used.

When a surfactant is used, the amount of the surfactant in the composition (i.e., amount of surfactant with respect to the whole composition) is preferably 0.001-5 wt %, more preferably 0.001-3 wt %, further preferably 0.01-3 wt %, from the aspects of coatability and acidic gas permeability.

<Acidic Gas Separation Membrane>

The composition of the present invention is preferably used for producing an acidic gas separation membrane. The present invention also provides an acidic gas separation membrane containing the aforementioned composition. The acidic gas is preferably at least one selected from the group consisting of carbon dioxide, hydrogen sulfide, carbonyl sulfide, sulfur oxide ($SO_x$), nitrogen oxide ($NO_x$) and hydrogen halide (e.g., hydrogen chloride), more preferably at least one selected from the group consisting of carbon dioxide, hydrogen sulfide, carbonyl sulfide, sulfur oxide ($SO_x$), and nitrogen oxide ($NO_x$), further preferably at least one selected from the group consisting of carbon dioxide, hydrogen sulfide and sulfur oxide ($SO_x$), particularly preferably carbon dioxide and/or hydrogen sulfide, most preferably carbon dioxide.

The acidic gas separation membrane of the present invention may be a composition membrane (i.e., membrane composed of the composition of the present invention), or one containing a composition membrane and other member (e.g., porous layer). The thickness of the composition membrane in the acidic gas separation membrane of the present invention is preferably 0.1-600 μm, more preferably 0.5-400 μm, further preferably 1-200 μm.

The acidic gas separation membrane of the present invention preferably contains a porous layer. The porous layer may be a single layer or a laminate. The acidic gas separation membrane of the present invention may have one porous layer, or two or more porous layers. The two or more porous layers may be the same or different.

As the material of the porous layer, a resin can be mentioned. only one kind or two or more kinds of resins may be used. Examples of the resin include polyolefin resins such as polyethylene (PE), polypropylene (PP) and the like; fluorine-containing resins such as polytetrafluoroethylene (PTFE), poly(vinyl fluoride)(PVF), poly(vinylidene fluoride)(PVDF) and the like; polyester resins such as poly(ethylene terephthalate)(PET), poly(ethylene naphthalate) and the like; polystyrene (PS), polyethersulfone (PES), polyphenylene sulfide (PPS), polysulfone (PSF), polyacrylonitrile (PAN), poly(phenylene oxide)(PPO), polyamide (PA), polyimide (PI), polyetherimide (PEI), polyetheretherketone (PEEK), aramid, polycarbonate and the like. Among these, polyolefin resin and fluorine-containing resin are preferable, polytetrafluoroethylene (PTFE) is more preferable, from the aspect of water repellency.

As the material of the porous layer, inorganic materials such as metal, glass, ceramics and the like can be mentioned in addition to the above-mentioned resins. The porous layer may contain both a resin and an inorganic material.

While the thickness of the porous layer is not particularly limited, the thickness thereof is preferably 10-3,000 μm, more preferably 10-500 μm, further preferably 20-200 μm, from the aspect of mechanical strength.

The average pore diameter of the porous layer is preferably not less than 0.0005 μm, more preferably not less than 0.001 μm, further preferably not less than 0.005 μm, preferably not more than 10 μm, more preferably not more than 5 μm, further preferably not more than 1 μm. The average pore diameter is a value measured by mercury porosimetry. The maximum pore diameter of the porous layer is preferably not less than 0.05 μm and not more than 1.0 μm, more preferably not less than 0.07 μm and not more than 0.9 μm.

The porosity of the porous layer is preferably 5-99% by volume, more preferably 30-90% by volume. The porosity is a value measured by mercury porosimetry.

The porous layer is preferably hydrophobic. Using a supporting layer having a hydrophobic porous layer, infiltration of water in the composition membrane into the pores of the porous layer can be suppressed, and a decrease in the property of the acidic gas separation membrane can be suppressed.

The index of the hydrophobicity is, for example, a contact angle of water at 25° C. The contact angle of water at 25° C. of the porous layer is preferably not less than 90 degrees, more preferably not less than 95 degrees, further preferably not less than 100 degrees. The contact angle of water can be measured by a contact angle meter (e.g., dynamic contact angle tester 1100DAT: FIbro SystemAB).

The porous layer preferably has heat resistance. In the present specification, "heat resistance" means that a porous layer after preservation at the maximum temperature in the process conditions for 2 hr is free of curl due to heat shrink or thermal melting, which curl can be confirmed by visual observation.

<Production Method of Acidic Gas Separation Membrane>

The present invention also provides a method for producing the aforementioned acidic gas separation membrane, including a step of preparing a coating liquid by mixing the aforementioned components (A)-(C) and a medium, a step of applying the coating liquid on a porous layer to form a film of the coating liquid, and a step of removing the medium from the film of the coating liquid. In the production method of the present invention, the explanations of the kind and amount of the components (A)-(C), the kind of the medium, β and the like are as mentioned above.

The amount of the medium in the coating liquid is preferably 1.0-99.9 wt %, more preferably 3.0-97 wt %, further preferably 5.0-95 wt %, from the aspect of coatability. The amount of the medium means the amount of the medium with respect to the whole coating liquid.

When water is used as the medium, the amount of water in the coating liquid is preferably 10-99.9 wt %, more preferably 20-97 wt %, further preferably 30-95 wt %, from the aspect of coatability. The amount of the water means the amount of the water with respect to the whole coating liquid.

First, components (A)-(C) and a medium are mixed to prepare a coating liquid which is one embodiment of the composition of the present invention. The coating liquid may contain a surfactant as necessary to suppress coating unevenness due to the affinity with a substrate. The explanation of the surfactant is as mentioned above.

Next, the coating liquid is applied to a porous layer to form a film of the coating liquid. The coating method is not particularly limited, and a known method can be appropriately adopted according to the object. Examples of the coating method include spin coating method, bar coating method, die coating method, blade coating method, air knife coating method, gravure coating method, roll coating method, spray coating method, dip coating method, comma roll coating method, kiss coating method, screen printing, inkjet printing and the like.

Where necessary, a porous layer (second porous layer) may be laminated on the film of the coating liquid formed on the porous layer (first porous layer).

Then, a composition film is formed by removing the medium from the film of the coating liquid to produce an acidic gas separation membrane. The method for removing the medium is not particularly limited, and a conventionally known method can be used. As a method for removing the medium, a method of drying the film of the coating liquid by using a dryer is preferable. Examples of the dryer include forced-air drying oven and the like.

The drying temperature and time may be appropriately determined in consideration of the medium of the coating liquid, the kind of the porous layer, and the like. The drying temperature is, for example, 80-150° C. The drying time is, for example, 3-30 min.

<Acidic Gas Separation Membrane Element>

The present invention also provides an acidic gas separation membrane element containing the aforementioned acidic gas separation membrane. The acidic gas separation membrane element is composed of an accumulated or integrated acidic gas separation membrane. Examples of the acidic gas separation membrane include shapes such as sheet, hollow and the like. When the acidic gas separation membrane element contains a sheeted acidic gas separation membrane, for example, shapes such as spiral-wound type, plate & frame type, pleated type and the like can be adopted and when it contains a hollow acidic gas separation membrane, for example, shapes such as hollow-fiber type, cylindrical type can be adopted.

The acidic gas separation membrane element of the present invention preferably contains a laminated body comprising the acidic gas separation membrane and at least one of a feed-side flow path member and a permeate-side flow path member, and a hollow tube with plural holes formed on a wall, and has a structure wherein the laminated body is wound around the hollow tube. One embodiment of the acidic gas separation membrane element of the present invention is explained below by referring to FIG. 1.

The acidic gas separation membrane element 1 shown in FIG. contains an acidic gas separation membrane 10, a feed-side flow path member 3 and a permeate-side flow path member 4, and a laminated body of these is wound around a central tube 5. The shape of the laminated body being wound around may be either a cylindrical shape or a square tubular shape, preferably a cylindrical shape.

The acidic gas separation membrane element 1 may be further provided with fixing members such as a peripheral tape, an anti-telescope device (ATD) and the like (not shown) to prevent unrolling or rolling collapse of the wound laminated body, and may have an outer wrap (reinforcing layer) on the outermost periphery of the wound laminated body to secure the strength against the load due to the internal pressure and the external pressure applied to the acidic gas separation membrane element 1. The peripheral tape can suppress the unwinding of the wound laminated body by rolling around the peripheral of the wound laminated body. The anti-telescope device is attached to both edges of the wound laminated body to suppress development of a winding collapse (telescope) phenomenon on the wound laminated body during use of the acidic gas separation membrane element 1. For the outer wrap (reinforcing layer), for example, a reinforcing material such as a fiber-reinforced resin in which glass fiber is impregnated with an epoxy resin can be used, and it is preferable to cure the epoxy resin after winding the reinforcing material around the outermost peripheral of the wound laminated body.

For example, a permeate-side flow path member 4 that forms a gas flow path on the permeate side, an acidic gas separation membrane 10, a feed-side flow path member 3 that forms a gas flow path on the feed side, an acidic gas separation membrane 10 may be laminated repeatedly in this order to constitute the laminated body.

The feed-side flow path member 3 is a member to which a feed gas is fed, and the feed gas is fed to the acidic gas separation membrane 10 through the member. The permeate-side flow path member 4 is a member through which a permeate gas that has passed through the acidic gas separation membrane 10 (including at least a part of the feed gas fed to the acidic gas separation membrane 10) flows, and guides the permeate gas to the central tube 5. The central tube 5 collects the permeate gas flowing through the permeate-side flow path member 4.

The laminated body may contain an acidic gas separation membrane—flow path member composite (membrane leaf). The acidic gas separation membrane—flow path member composite is constituted of opposing acidic gas separation membranes 10, and a flow path member sandwiched between the opposing acidic gas separation membranes 10. The opposing acidic gas separation membrane 10 may be a folded separation membrane formed by folding one acidic gas separation membrane in half, or combined separation membranes in which two acidic gas separation membranes are combined to face each other. The flow path member sandwiched between the opposing acidic gas separation membranes 10 is, for example, the feed-side flow path member 3, or may be the permeate-side flow path member 4.

When the acidic gas separation membrane—flow path member composite contains the feed-side flow path member 3, the feed-side flow path member 3 forms a flow path space from which a feed gas is fed, and the flow path space guides the feed gas into the inside of the wound laminated body to feed the feed gas to the acidic gas separation membrane 10.

The feed-side flow path member 3 is preferably provided with a function as a flow path member that forms a flow path space for the feed gas, and a function of minimizing the pressure loss of the fed feed gas while causing a turbulent flow in the feed gas to promote surface renewal of the feed-side surface of the acidic gas separation membrane 10. From this aspect, the feed-side flow path member 3 preferably has a mesh shape. Since the flow path of the feed gas changes depending on the mesh shape, the shape of the mesh unit lattice in the feed-side flow path member 3 is preferably selected from, for example, shapes such as square, rectangle, rhombus, parallelogram and the like according to the object.

Examples of the material constituting the feed-side flow path member 3 include resins such as polyethylene (PE), polypropylene (PP), polytetrafluoroethylene (PTFE), polystyrene (PS), polyphenylene sulfide (PPS), polyethersulfone (PES), polyetheretherketone (PEEK), polyimide (PI), poly(cyclohexylene methylene terephthalate)(PCT), polysulfone (PSF) and the like; inorganic materials such as metal, glass, ceramics and the like; and a combination of a resin material and an inorganic material. The material constituting the feed-side flow path member 3 preferably has heat resistance according to the temperature conditions in which the acidic gas separation membrane 10 is used. In addition, the material constituting the feed-side flow path member 3 preferably has high mechanical strength (rigidity) from the viewpoint of maintaining the function as the flow path member forming the flow path space for the feed gas.

The feed-side flow path member 3 preferably contains a layer made of non-woven fabric, woven fabric or net containing at least one material selected from the group consisting of resin, metal and glass, more preferably contains a layer made of non-woven fabric, woven fabric or net containing at least one material selected from the group consisting of PE, PP, PTFE, PS, PPS, PES, PEEK, PI, PCT, PSF, metal and glass.

The feed-side flow path member 3 may have a one-layer structure or a laminate structure having two or more layers. The feed-side flow path member 3 may have, for example, a structure in which a plurality of layers made of the above-mentioned non-woven fabric, woven fabric, or net are laminated.

The thickness of the feed-side flow path member 3 (when it has a structure with plural laminated layers, the total thickness thereof) is preferably 10-7500 μm, more preferably 50-5000 μm, further preferably 100-2500 μm, from the aspects of pressure loss of flowing gas, mechanical strength and the like.

The permeate-side flow path member 4 forms a flow path space through which the permeate gas that has passed through the acidic gas separation membrane 10 flows, and the permeate gas is guided to the central tube 5 by this flow path space.

The permeate-side flow path member 4 is preferably provided with a function as a flow path member that forms a flow path space for the permeate gas, and a function of causing a turbulent flow in the permeate gas to promote surface renewal of the permeate-side surface of the acidic gas separation membrane 10. From this aspect, the permeate-side flow path member 4 preferably has a mesh shape. Since the flow path of the permeate gas changes depending on the mesh shape, the shape of the mesh unit lattice in the permeate-side flow path member is preferably selected from, for example, shapes such as square, rectangle, rhombus, parallelogram and the like according to the object.

The material constituting the permeate-side flow path member 4 is not particularly limited, and a material having heat resistance according to the temperature conditions in which the acidic gas separation membrane 10 is used is preferable, and, for example, a material similar to the material constituting the feed-side flow path member 3 can be preferably used. As the material constituting the permeate-side flow path member 4, PP, PTFE, PPS, PES, PSF, PEEK, PI, metal is specifically preferable, and PP, PTFE, PPS, PEEK, PI, and metal are more preferable. The permeate-side flow path member 4 may be a one-layer structure or a laminate structure having two or more layers.

The central tube 5 is a conduit tube for collecting a permeate gas that has passed through the acidic gas separation membrane 10 and discharging it from the acidic gas separation membrane element 1. The central tube 5 may be a circular tube or a square tube.

The material of the central tube 5 is not particularly limited, and a material having heat resistance according to the temperature conditions in which the acidic gas separation membrane 10 is used is preferable. The material of the central tube 5 is preferably a material having mechanical strength in order to wind the acidic gas separation membrane 10 and the like around the outer peripheral plural times. The material of the central tube 5 is preferably used for stainless steel and the like. The diameter, length, and thickness of the central tube 5 are appropriately determined according to the size of the acidic gas separation membrane element 1, the number of acidic gas separation membrane—flow path member composites in the laminated body, the amount of permeate gas, the mechanical strength required for the central tube 5, and the like.

The central tube 5 has a plurality of holes on the outer peripheral surface of the central tube 5 for communicating the flow path space for the permeate gas of the permeate-side flow path member 4 and the internal space of the central tube 5. The number of holes and the size of the holes provided in the central tube 5 are determined in consideration of the amount of permeate gas fed from the permeate-side flow path member 4 and the mechanical strength required for the central tube 5.

The acidic gas separation membrane element of the present invention can be produced by forming a laminated body comprising the acidic gas separation membrane and at least one of a feed-side flow path member and a permeate-side flow path member and wound same around a hollow tube. The method for producing the acidic gas separation membrane element is not particularly limited, and a known method can be used. Examples of the fixing means for each member include use of adhesive tape, adhesive agent and the like, thermal adhesion and the like.

Examples of the adhesive component of the adhesive agent include epoxy resin, vinyl chloride copolymer, vinyl chloride-vinyl acetate copolymer, vinyl chloride-vinylidene chloride copolymer, vinyl chloride-acrylonitrile copolymer, butadiene-acrylonitrile copolymer, polyamide resin, polyvinyl butyral resin, polyester resin, cellulose derivative (nitrocellulose etc.), styrene-butadiene copolymer, synthetic rubber, phenol resin, urea resin, melamine resin, phenoxy resin, silicone resin, urea formamide resin and the like. Among these, epoxy resin and silicone resin are preferable, and epoxy resin is more preferable.

Figure 2:
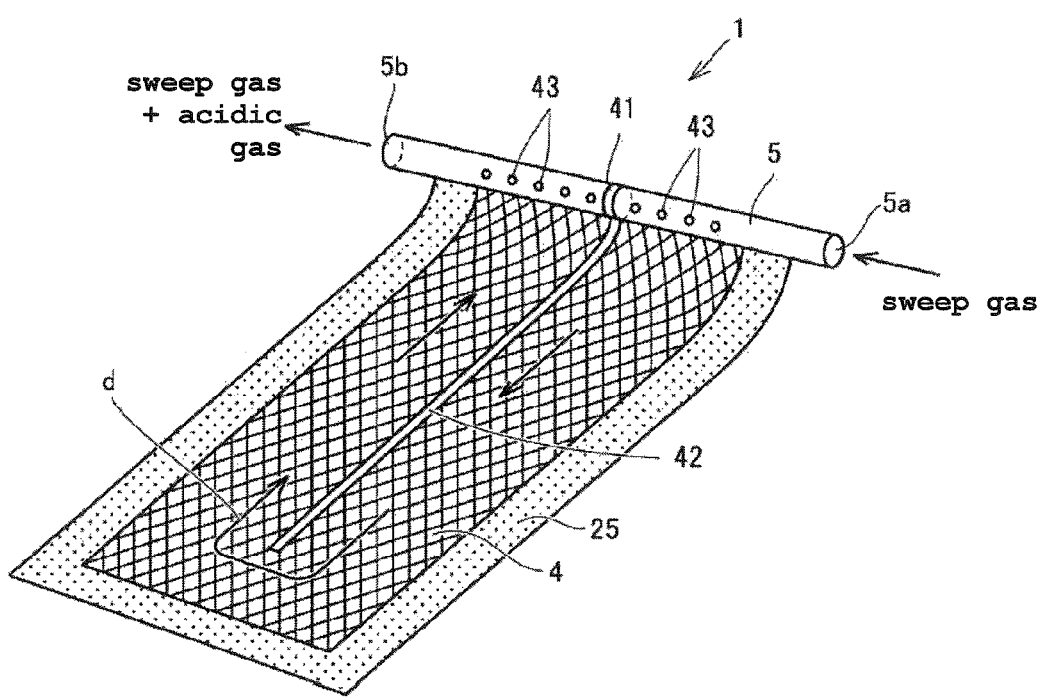
FIG. 2 is a schematic perspective view which expands and shows one embodiment of the acidic gas separation membrane element of the present invention.

In addition, using FIG. 2, one embodiment of the acidic gas separation membrane element of the present invention, which is different from the element of FIG. 1, is described. The acidic gas separation membrane element shown in FIG. 2 is different from the acidic gas separation membrane element shown in FIG. 1 in that the central tube 5 and the permeate-side flow path member 4 have additional configurations, and other configurations of these elements are the same.

In the acidic gas separation membrane element 1 shown in FIG. 2, a blocking member 41 is provided in the inside of the central tube 5, and a partition member 42 extends in the permeate-side flow path member 4 at a position corresponding to the blocking member 41 in a direction perpendicular to the central tube 5. The blocking member 41 and the partition member 42 define the gas flow path by blocking the permeation of the gas.

In the gas separation membrane element 1, the sweep gas supplied from the edge 5*a* of the central tube 5 is guided out to the permeate-side flow path member 4 from the hole 43 provided in the central tube 5, flows in the flow path defined by the partition member 42 in the direction of arrow d, and reaches the inside of the central tube 5 from the hole 43 provided on the downstream side of the blocking member 41 of the central tube 5. That is, the edge 5*a* of the central tube 5 functions as a sweep gas-supply port. One edge 5*a* (sweep gas-supply port) of the central tube 5 communicates with the permeate-side flow path formed by the permeate-side flow path member 4. The flow of the sweep gas in the permeate-side flow path member 4 promotes the flow of the permeate gas in the permeate-side flow path member 4. The permeate gas reaches the central tube 5 together with the sweep gas and is guided out from the edge 5*b* of the central tube 5.

In the gas separation membrane element 1, the position of the blocking member 41 is not limited to the vicinity of the center of the central tube 5 shown in FIG. 2, and only needs to be disposed in the central tube 5 such that the flow path of the sweep gas supplied to the permeate-side flow path member 4 and the flow path of the mixed gas of the permeate gas and the sweep gas recovered from the permeate-side flow path member 4 are partitioned.

The sweep gas is not particularly limited and a gas containing at least one selected from the group consisting of air, oxygen, carbon dioxide, nitrogen, argon, helium, and water vapor can be used.

<Acidic Gas Separation Membrane Module>

The present invention also provides an acidic gas separation membrane module containing the aforementioned acidic gas separation membrane element. The acidic gas separation membrane module of the present invention preferably contains at least one acidic gas separation membrane element, a mixed gas-feed part for feeding a mixed gas to the acidic gas separation membrane, a retentate gas-exhaust part for exhausting a retentate gas that did not pass through the acidic gas separation membrane, and a permeate gas-exhaust part for exhausting a permeate gas that passed through the acidic gas separation membrane. The above-mentioned mixed gas-feed part, retentate gas-exhaust part and permeate gas-exhaust part may be provided in the main body of the acidic gas separation membrane element, or in the housing (container) for accommodating acidic gas separation membrane element.

When two or more acidic gas separation membrane elements are accommodated in the housing, two or more acidic gas separation membrane elements can be arranged in parallel or in series in the housing. In addition, two or more acidic gas separation membrane element groups arranged in parallel may be further arranged in series. The mixed gas may be distributed and introduced into plural acidic gas separation membrane elements (parallel feed of mixed gas), or the permeate gas and/or retentate gas discharged from the previous acidic gas separation membrane element stage may be introduced into the later acidic gas separation membrane element (series feed of mixed gas). The acidic gas separation membrane module can be produced by accommodating at least one acidic gas separation membrane element in a housing and attaching a mixed gas-feed part, a retentate gas-exhaust part and a permeate gas-exhaust part to the housing.

In the following, one embodiment of the acidic gas separation membrane module of the present invention is explained using FIG. 3. The acidic gas separation membrane module 20 shown in FIG. 3 contains a mixed gas-feed part 21, a retentate gas-exhaust part 22, and a permeate gas-exhaust part connected to the edge of the central tube 5 of the acidic gas separation membrane element 1 with connecting part 29*a*, all provided in the housing 27. The housing 27 may form a space for enclosing a mixed gas flowing in the acidic gas separation membrane module. For example, it may have a tubular member of stainless steel or a wet-heat resistant resin or the like, and a closing member 28 for closing both edges of the tubular member in the axial direction. The shape of the housing 27 is generally a tubular shape. The tubular shape may be any of a cylindrical shape and a square tube shape. Since the shape of the acidic gas separation membrane element 1 is generally a cylindrical shape, the shape of the housing 27 is preferably a cylindrical shape. A partition 24 can be provided inside the housing 27 to prevent mixing of a mixed gas fed to the feed-side edge 25 of the acidic gas separation membrane element 1, and a retentate gas discharged from the exhaust-side edge 26 of the acidic gas separation membrane element 1 (that is, a gas that did not permeate the acidic gas separation membrane). In addition, a blocking section 29*b* for preventing mixing of a mixed gas fed to the feed-side edge 25 of the acidic gas separation membrane element 1 and the permeate gas that has passed through the acidic gas separation membrane can be provided at the edge of the central tube 5 not connected to the so permeate gas-exhaust part 23 of the acidic gas separation membrane element 1.

Figure 3:
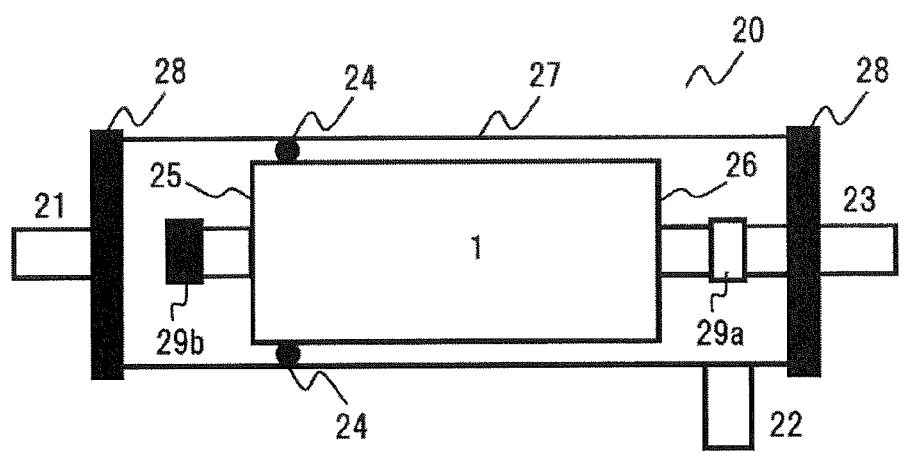
FIG. 3 is a configuration diagram schematically showing one embodiment of the acidic gas separation membrane module of the present invention.

In the following, one embodiment of the acidic gas separation membrane module of the present invention, which is different from the module of FIG. 3, is described using FIG. 4. The acidic gas separation membrane module 20' shown in FIG. 4 is different from the module 20 of FIG. 3 in that a sweep gas-supply part 30 connected by the connecting part 29c shown in FIG. 4 is contained instead of the blocking part 29b shown in FIG. 3, and other configurations of these modules are the same.

Figure 4:
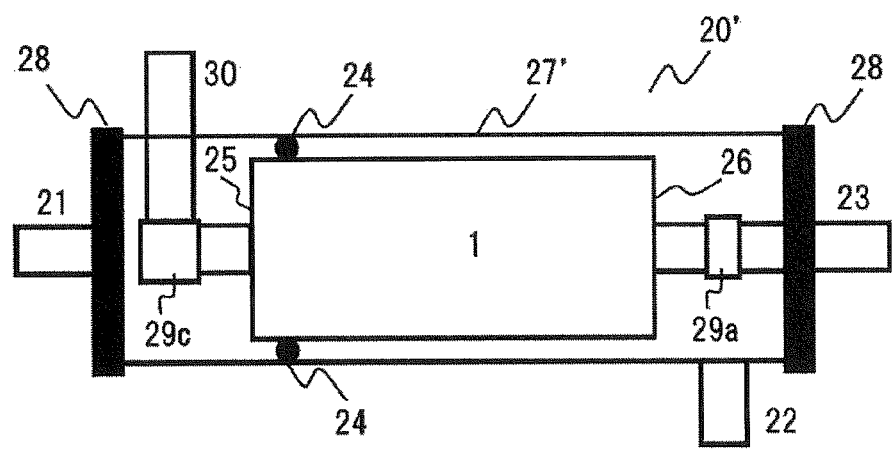
FIG. 4 is a configuration diagram schematically showing one embodiment of the acidic gas separation membrane module of the present invention.

The mixed gas-feed part 21, retentate gas-exhaust part 22, permeate gas-exhaust part 23, and sweep gas-supply part 30 are not limited to the arrangements shown in FIG. 3 and FIG. 4, and can be appropriately disposed in consideration of the drain discharge of the process gas (mixed gas, retentate gas, permeate gas, etc.), configuration of acidic gas separation membrane module, and the like.

<Acidic Gas Separation Apparatus>

The present invention also provides an acidic gas separation apparatus containing at least one acidic gas separation membrane module described above. The arrangement and number of acidic gas separation membrane modules in the acidic gas separation apparatus, and the arrangement and number of the acidic gas separation membrane elements in the acidic gas separation membrane module can be selected according to the required throughput, the recovery ratio of the acidic gas, the size of the place where the acidic gas separation apparatus is installed, and the like.

The acidic gas separation apparatus of the present invention preferably contains, in addition to the at least one acidic gas separation membrane module, at least one of a means of reducing the pressure of the permeate gas, and a means of supplying a sweep gas that is exhausted together with the permeate gas, wherein the means of reducing the pressure of the permeate gas communicates with a permeate gas-exhaust part of the acidic gas separation membrane module, and the means of supplying a sweep gas communicates with a sweep gas-supply part of the acidic gas separation membrane module.

When the acidic gas is carbon dioxide ($CO_2$), since the acidic gas separation membrane can remove water vapor simultaneously with $CO_2$ from a feed gas containing $CO_2$ and water vapor, the aforementioned acidic gas separation membrane, acidic gas separation membrane module, and acidic gas separation apparatus can be used for removing $CO_2$ and water vapor from various gases. Examples of various gas include reformed gas obtained by reforming hydrocarbons and used for the production of hydrogen, and the like; electrochemical oxidation reaction gas containing hydrogen generated from reformed gas as a material in fuel cells, etc.; a bio gas obtained by methane fermentation of biomass and the like; flue gases generated in boiler, etc., and the like.

<Production Apparatus of Hydrogen Using Acidic Gas Separation Membrane Module and Production Method of Hydrogen>

The acidic gas separation membrane module (separation membrane module) can be used in a hydrogen production apparatus. In this case, the acidic gas separation membrane module can selectively permeate a gas component (specific fluid component) containing carbon dioxide gas from a feed gas (material fluid) containing at least hydrogen and carbon dioxide. The acidic gas separation membrane module provided in the hydrogen production apparatus may be provided as an acidic gas separation apparatus including an acidic gas separation membrane module.

The hydrogen contained in the feed gas fed to the acidic gas separation membrane module may be contained in the reformed gas produced by the reforming reaction of the hydrocarbon. Crude purified hydrogen (hydrogen) can be produced by removing $CO_2$ and water vapor from the reformed gas by using an acidic gas separation membrane. The hydrocarbon reforming reaction can be performed by either $CO_2$ reforming using $CO_2$, water vapor reforming using water vapor, or a combination of these two reformings. Therefore, when producing crude purified hydrogen, the mixed gas containing $CO_2$ and water vapor recovered by removal using an acidic gas separation membrane can be reused for the hydrocarbon reforming reaction. As a result, the amount of the material used for the hydrocarbon reforming reaction can be reduced.

In the acidic gas membrane separation by an acidic gas separation membrane provided in an acidic gas separation apparatus or an acidic gas separation membrane module, the throughput of acidic gas membrane separation is determined by the amount of permeate gas that permeates the acidic gas separation membrane. As a method for improving the throughput of acidic gas membrane separation, a method of increasing the partial pressure of gas on the feed side to higher than the partial pressure of gas on the permeate side (the side from which the permeate gas of the acidic gas separation membrane 10 is discharged) by increasing the pressure of the feed gas fed to the feed side of the acidic gas separation membrane via the mixed gas-feed part provided in the acidic gas separation membrane module with a compressor or the like; a method of setting the gas partial pressure on the feed side higher than the gas partial pressure on the permeate side by reducing the pressure of the permeate side of the acidic gas separation membrane via the permeate gas-exhaust part provided in the acidic gas separation membrane module (hereinafter sometimes referred to as "reduced pressure method; a method of increasing the amount of permeate gas by supplying a sweep gas for discharging together with the permeate gas to the permeate side of the acidic gas separation membrane via the sweep gas-supply part provided in the acidic gas separation membrane module (hereinafter sometimes referred to as "sweep method"); a method that combines two or more of these, and the like can be mentioned. Among these, the reduced pressure method is preferably used since when at least a part of the permeate gas is reused, it is not necessary to supply a new gas (sweep gas), and the permeate gas alone can be separated.

High purified hydrogen can be obtained by purifying the crude purified hydrogen obtained as described above. According to this method, energy saving and reduction of hydrogen loss are expected in the chemical absorption method and the pressure swing adsorption method (PSA), which are purification means, as compared with the case where the reformed gas is purified to obtain high purified hydrogen.

In the following, a method for producing hydrogen by water vapor reforming of $CH_4$ and $CO_2$ reforming of $CH_4$ using methane ($CH_4$) as a hydrocarbon is described with reference to the drawings. FIG. 5-FIG. 14 are configuration diagrams schematically showing one embodiment of a hydrogen production apparatus using an acidic gas separation membrane.

(Hydrogen Production Apparatus 100a and Production Method of Hydrogen Using Same)

Figure 5:
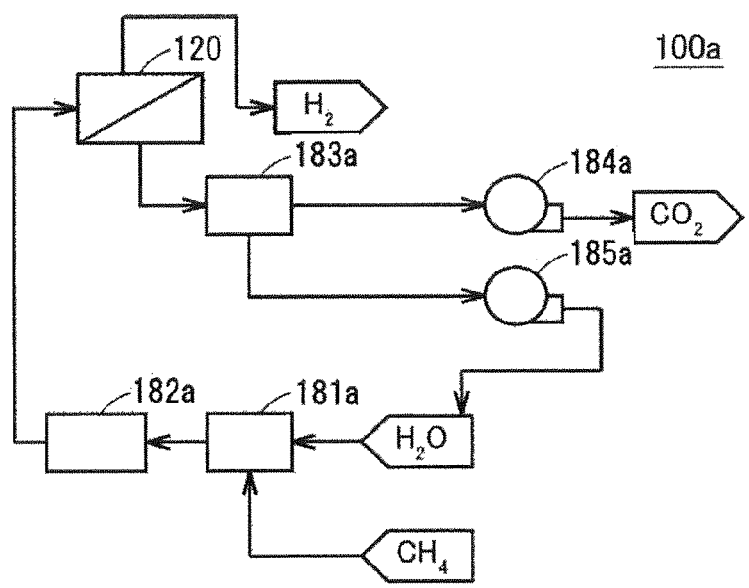
FIG. 5 is a configuration diagram schematically showing one embodiment of a hydrogen production apparatus.

The hydrogen production apparatus 100a shown in FIG. 5 is an apparatus for producing hydrogen by water vapor reforming, and acidic gas membrane separation is performed by a reduced pressure method. The hydrogen production apparatus 100a contains mixer 181a, water vapor reformer 182a for water vapor reforming, acidic gas separation apparatus 120 provided with an acidic gas separation membrane module having an acidic gas separation membrane, condenser 183a, vacuum pump 184a, and drainage pump 185a.

The mixer 181a is used to feed $CH_4$ and water vapor ($H_2O$ in the Figure), which are materials for water vapor reforming, to a water vapor reformer 182a. Examples of the mixer 181a include mixer, vaporizer, sprayer, ejector, a combination of two or more of these, and the like.

The water vapor reformer 182a is used to perform water vapor reforming by using $CH_4$ and water vapor fed from mixer 181a. The water vapor reformer 182a can have a reforming part that reforms $CH_4$ into carbon monoxide (CO) and hydrogen ($H_2$) by a water vapor reforming reaction shown by reaction formula (II):

$$CH_4 + H_2O \leftrightarrow CO + 3H_2 \quad \text{(II)}$$

and a conversion part that converts CO into $CO_2$ and $H_2$ by a CO conversion reaction shown by reaction formula (III):

$$CO + H_2O \leftrightarrow CO_2 + H_2 \quad \text{(III)}.$$

The acidic gas separation apparatus 120 is provided with an acidic gas separation membrane module having an acidic gas separation membrane, and is used for selectively separating $CO_2$ and water vapor from the feed gas (reformed gas and water vapor) fed to the acidic gas separation apparatus 120. The acidic gas separation apparatus 120 is fed with a reformed gas containing $H_2$ and $CO_2$ produced by the water vapor reformer 182a. This reformed gas also contains water vapor (unreacted water vapor in the material) fed as a material for water vapor reforming. Therefore, in the acidic gas separation device 120, a mixed gas containing $CO_2$ and water vapor can be separated from crude purified hydrogen enriched with $H_2$ by selective permeation of $CO_2$ and water vapor through an acidic gas separation membrane from a feed gas containing the fed reformed gas and water vapor. In the acidic gas separation apparatus 120, the flow direction of the feed gas (reformed gas and water vapor) fed to an acidic gas separation membrane provided in the acidic gas separation apparatus 120, and the flow direction of the permeate gas ($CO_2$ and water vapor) that has permeated an acidic gas separation membrane provided in the acidic gas separation apparatus 120 may be a parallel flow or a countercurrent flow.

The condenser 183a is used to separate $CO_2$ and water vapor in the mixed gas that has permeated an acidic gas separation membrane provided in the acidic gas separation apparatus 120. The condenser 183a separates liquefied water and $CO_2$ by cooling $CO_2$ and water vapor and liquefying the water vapor. The vacuum pump 184a is used to recover $CO_2$ separated by the condenser 183a. The drainage pump 185a is used to recover water.

In the hydrogen production apparatus 100a shown in FIG. 5, hydrogen can be produced as follows. First, $CH_4$ and water, which are materials for water vapor reforming, are fed to a mixer 181a. The water fed to the mixer 181a is not particularly limited as long as it is suitable as a material for water vapor reforming, and may be procured from other than the hydrogen production apparatus 100a. As shown in FIG. 5, water recovered in the acidic gas separation apparatus 120 in the below-mentioned production method of hydrogen may be used. When water recovered by the acidic gas separation apparatus 120 is insufficient as a material for water vapor reforming, the insufficient amount of water may be added to the water recovered by the acidic gas separation apparatus 120 and fed to the mixer 181a. $CH_4$ and water vapor adjusted by the mixer 181a are fed to the water vapor reformer 182a, and the water vapor reforming reaction shown by the above-mentioned reaction formula (II) and the CO conversion reaction shown by the above-mentioned reaction formula (III) are carried out, whereby $H_2$ and $CO_2$ are produced as reformed gas.

Since the produced reformed gas also contains the unreacted water vapor fed as a material for water vapor reforming, a feed gas containing water vapor together with the reformed gas ($H_2$ and $CO_2$) is fed to the acidic gas separation apparatus 120. Since the acidic gas separation membrane provided in the acidic gas separation apparatus 120 can selectively permeate $CO_2$ and water vapor, a mixed gas containing $CO_2$ and water vapor can be separated from a feed gas enriched with $H_2$ in the acidic gas separation apparatus 120, and crude purified hydrogen can be obtained ($H_2$ in the Figure). The composition (ratio of $CO_2$ and water vapor) of the permeate gas that has permeated an acidic gas separation membrane provided in the acidic gas separation apparatus 120 can be adjusted by controlling the pressure on the permeate side. $CO_2$ and water vapor that have selectively permeated an acidic gas separation membrane provided in the acidic gas separation apparatus 120 are separated into liquefied water and $CO_2$ by liquefying water vapor in the condenser 183a, $CO_2$ is recovered by the vacuum pump 184a, and water is recovered by the drainage pump 185a. The water recovered by the drainage pump 185a can be reused as a material for water vapor reforming.

In the hydrogen production apparatus 100a shown in FIG. 5, the case where $CO_2$ and water vapor are separated using the condenser 183a is described as an example. $CO_2$ and water vapor may also be separated using a water vapor separation membrane instead of the condenser 183a. In this case, the water vapor separated with the water vapor separation membrane may be directly fed to the mixer 181a without liquefaction.

(Hydrogen Production Apparatus 100b and Production Method of Hydrogen Using Same)

Figure 6:
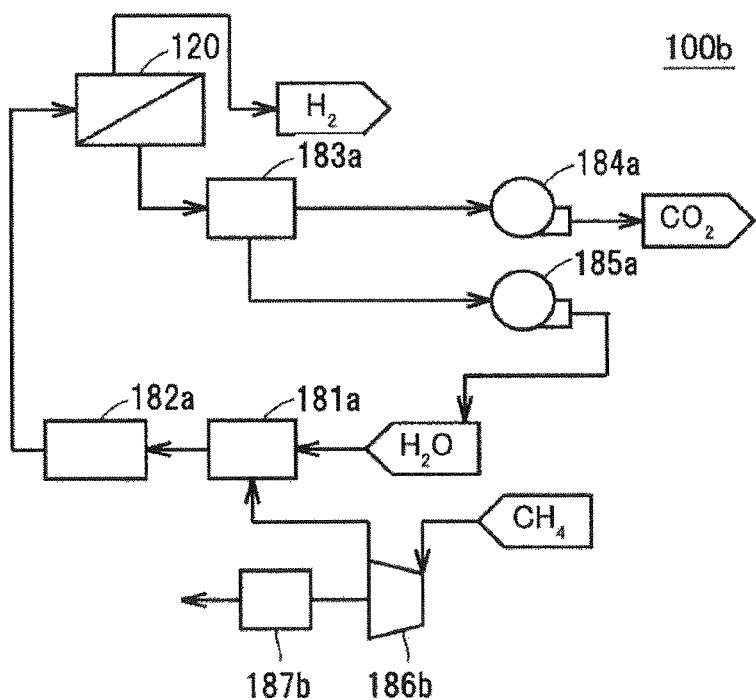
FIG. 6 is a configuration diagram schematically showing one embodiment of a hydrogen production apparatus.

The hydrogen production apparatus 100b shown in FIG. 6 is an apparatus for producing hydrogen by water vapor reforming, and is different from the hydrogen production apparatus 100a shown in FIG. 5 in that $CH_4$ with a pressure higher than the pressure of the water vapor reforming reaction is used as $CH_4$ as a material for water vapor reforming. In the hydrogen production apparatus 100b, $CH_4$ with a pressure higher than the hydrogen production apparatus 100a is used. As a result, an electric power obtained by differential pressure power generation with $CH_4$ can be used to operate the equipment provided in the hydrogen production apparatus 100b. In the following, the same symbols are assigned to the same members explained in the hydrogen production apparatus 100a (FIG. 5) and the explanation thereof is omitted.

The hydrogen production apparatus 100b shown in FIG. 6 contains mixer 181a, water vapor reformer 182a, acidic gas separation apparatus 120, condenser 183a, vacuum pump 184a, drainage pump 185a, expansion turbine 186b, and generator 187b. The explanation of each member other than the expansion turbine 186b and generator 187b is the same as above.

The expansion turbine 186b is driven by the introduction of CH$_4$ with a pressure higher than the pressure of CH$_4$ used for the water vapor reformer 182a, along with which the introduced CH$_4$ is expanded to reduce pressure. CH$_4$ depressurized by the expansion turbine 186b is fed to the mixer 181a. The generator 187b generates power by being driven by the rotation of the expansion turbine 186b. The electric power generated by the generator 187b can be used for driving vacuum pump 184a or drainage pump 185a.

In the hydrogen production apparatus 100b shown in FIG. 6, hydrogen can be produced as follows. First, CH$_4$ which is a material for water vapor reforming is introduced into an expansion turbine 186b. In the expansion turbine 186b, the expansion turbine 186b rotates when CH$_4$ is sprayed on the blade part and drives the generator 187b. In this way, the generator 187b generates power. CH$_4$ expanded and depressurized by the expansion turbine 186b is fed to the mixer 181a. The water is not particularly limited as long as it is suitable as a material for water vapor reforming, and may be procured from other than the hydrogen production apparatus 100b. As shown in FIG. 6, water recovered in the below-mentioned acidic gas separation apparatus 120 may be used. When water recovered by the acidic gas separation apparatus 120 is insufficient as a material for water vapor reforming, the insufficient amount of water may be added to the water recovered by the acidic gas separation apparatus 120 and fed to the mixer 181a. CH$_4$ and water vapor adjusted by the mixer 181a are fed to the water vapor reformer 182a, and the water vapor reforming reaction and the CO conversion reaction are performed.

Successively, a feed gas containing the reformed gas produced by the water vapor reformer 182a and unreacted water vapor in the material is fed to the acidic gas separation apparatus 120, and separated into a mixed gas containing CO$_2$ and water vapor and a feed gas enriched with H$_2$ to give crude purified hydrogen (H$_2$ in the Figure). The composition (ratio of CO$_2$ and water vapor) of the permeate gas that permeates an acidic gas separation membrane provided in the acidic gas separation apparatus 120 can be adjusted by controlling the pressure on the permeate side.

The CO$_2$ and water vapor that have selectively permeated an acidic gas separation membrane provided in the acidic gas separation apparatus 120 are separated into liquefied water and CO$_2$ due to liquefaction of water vapor in the condenser 183a, and CO$_2$ and water are respectively recovered by the vacuum pump 184a and drainage pump 185a driven by the electric power generated by the generator 187b. The recovered water can be reused as a material for water vapor reforming.

In the hydrogen production apparatus 100b shown in FIG. 6, the case where vacuum pump 184a and drainage pump 185a are driven by the electric power obtained in the generator 187b by differential pressure power generation is described as an example. The motive power obtained by rotation of the expansion turbine 186b due to the introduction of CH$_4$ may also be used for other purposes. For example, the motive power may be used for driving the vacuum pump 184a or the drainage pump 185a.

In the hydrogen production apparatus 100b, when the mixer 181a contains an ejector, CH$_4$ to be the material for water vapor reforming (CH$_4$ with higher pressure than the pressure of water vapor reforming reaction) may be used as a driving fluid for the ejector.

(Hydrogen Production Apparatus 100c and Production Method of Hydrogen Using Same)

Figure 7:
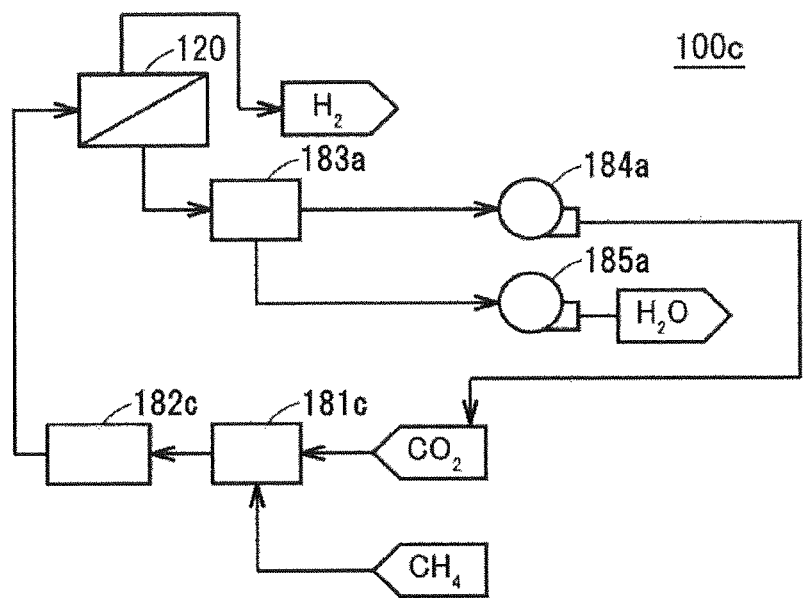
FIG. 7 is a configuration diagram schematically showing one embodiment of a hydrogen production apparatus.

The hydrogen production apparatus 100c shown in FIG. 7 is an apparatus for producing hydrogen by CO$_2$ reforming, and acidic gas membrane separation is performed by a reduced pressure method. In the following, the same symbols are assigned to the same members explained in the hydrogen production apparatus 100a (FIG. 5) and the like, and the explanation thereof is omitted. The hydrogen production apparatus 100c contains mixer 181c, CO$_2$ reformer 182c for CO$_2$ reforming, acidic gas separation apparatus 120 provided with an acidic gas separation membrane module having an acidic gas separation membrane, condenser 183a, vacuum pump 184a, and drainage pump 185a. The explanation of each member other than the mixer 181c and CO$_2$ reformer 182c is the same as above.

The mixer 181c is used to mix CH$_4$ and CO$_2$, which are materials for CO$_2$ reforming. Examples of the mixer 181c include mixer, ejector, a combination of two or more of these, and the like.

The CO$_2$ reformer 182c is used to perform CO$_2$ reforming by using CH$_4$ and CO$_2$ fed from the mixer 181c. The CO$_2$ reformer 182c can have a reforming part that reforms CH$_4$ into H$_2$ and CO by CO$_2$ reforming shown by reaction formula (IV):

$$CH_4+CO_2 \leftrightarrow 2CO+2H_2 \quad\quad (IV)$$

In the hydrogen production apparatus 100c shown in FIG. 7, hydrogen can be produced as follows. First, CH$_4$ and CO$_2$, which are materials for CO$_2$ reforming, are fed to a mixer 181c. The CO$_2$ fed to the mixer 181a is not particularly limited as long as it is suitable as a material for CO$_2$ reforming, and may be procured from other than the hydrogen production apparatus 100c. As shown in FIG. 7, CO$_2$ recovered in the below-mentioned acidic gas separation apparatus 120 may be used. When CO$_2$ recovered by the acidic gas separation apparatus 120 is insufficient as a material for CO$_2$ reforming, the insufficient amount of CO$_2$ may be added to the CO$_2$ recovered by the acidic gas separation apparatus 120 and fed to the mixer 181c. CH$_4$ and CO$_2$ mixed in the mixer 181c are fed to the CO$_2$ reformer 182c, and CO$_2$ reforming reaction shown by the above-mentioned reaction formula (IV) is performed, whereby H$_2$ and CO are produced as reformed gas. To promote selective permeation of an acidic gas, it is preferable to humidify in advance a feed gas containing the reformed gas to be fed to the acidic gas separation apparatus 120 and the unreacted CO$_2$ in the material. As the water to be used for humidifying the feed gas, the water recovered by the below-mentioned acidic gas separation apparatus 120 can be used. The CO$_2$ removal efficiency of the acidic gas separation apparatus can be improved by using the humidified feed gas for enriching CO$_2$ in the CO conversion reaction shown by reaction formula (III) before feeding the feed gas to the acidic gas separation apparatus 120.

The reformed gas produced by the CO$_2$ reformer 182c is preferably fed as a feed gas containing unreacted CO$_2$ in the material and water vapor added in advance for humidification to the acidic gas separation apparatus 120. The acidic gas separation membrane provided in the acidic gas separation apparatus 120 can selectively permeate CO$_2$ and water vapor. Therefore, a mixed gas containing CO$_2$ and water vapor and the feed gas enriched with H$_2$ can be separated, and crude purified hydrogen can be obtained (H$_2$ in the Figure). The composition of the permeate gas (ratio of CO$_2$ and water vapor) that permeates the acidic gas separation membrane provided in the acidic gas separation apparatus 120 can be adjusted by controlling the pressure on the permeate side.

The CO$_2$ and water vapor that selectively permeated the acidic gas separation membrane provided in the acidic gas separation device 120 are separated into liquefied water and $CO_2$ by liquefying the water vapor in the condenser 183a, and $CO_2$ is recovered by the vacuum pump 184a, and water is recovered by the drainage pump 185a. The $CO_2$ recovered by the vacuum pump 184a can be reused as a material for $CO_2$ reforming. In addition, the water recovered by the drainage pump 185a can be used for humidifying the reformed gas.

In the hydrogen production apparatus 100c shown in FIG. 7, a case where $CO_2$ and water vapor are separated by using a condenser 183a is described as an example. The $CO_2$ and water vapor may also be separated by using a water vapor separation membrane instead of the condenser 183a. In this case, the water vapor separated by the water vapor separation membrane may be directly used for humidifying the reformed gas without liquefaction.

(Hydrogen Production Apparatus 100d and Production Method of Hydrogen Using Same)

Figure 8:
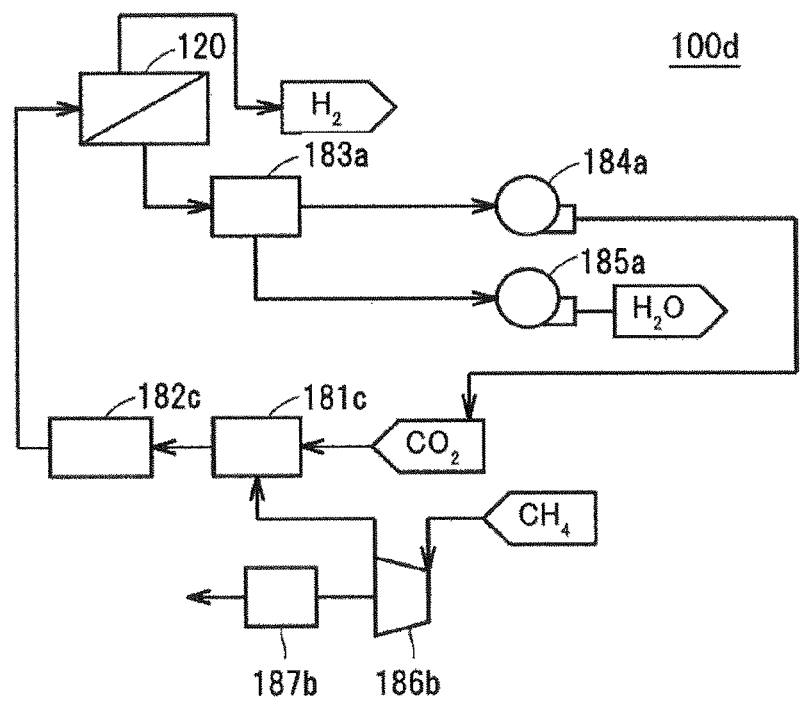
FIG. 8 is a configuration diagram schematically showing one embodiment of a hydrogen production apparatus.

The hydrogen production apparatus 100d shown in FIG. 8 is an apparatus for producing hydrogen by $CO_2$ reforming, and is different from the hydrogen production apparatus 100c shown in FIG. 7 in that $CH_4$ with a pressure higher than the pressure of the $CO_2$ reforming reaction is used as $CH_4$ as a material for $CO_2$ reforming. In the hydrogen production apparatus 100d, $CH_4$ with a pressure higher than the hydrogen production apparatus 100c is used. As a result, an electric power obtained by differential pressure power generation with $CH_4$ can be used to operate the equipment provided in the hydrogen production apparatus 100d. In the following, the same symbols are assigned to the same members explained in the hydrogen production apparatus 100a (FIG. 5) and the like, and the explanation thereof is omitted.

The hydrogen production apparatus 100d shown in FIG. 8 contains mixer 181c, $CO_2$ reformer 182c, acidic gas separation apparatus 120, condenser 183a, vacuum pump 184a, drainage pump 185a, expansion turbine 186b, and generator 187b. The explanation of each of these members is the same as above.

In the hydrogen production apparatus 100d shown in FIG. 8, hydrogen can be produced as follows. First, $CH_4$ which is a material for $CO_2$ reforming is introduced into an expansion turbine 186b, whereby the expansion turbine 186b rotates to drive the generator 187b and generate power. $CH_4$ expanded and depressurized by the expansion turbine 186b is fed to the mixer 181c and mixed with $CO_2$. The $CO_2$ is not particularly limited as long as it is suitable as a material for $CO_2$ reforming, and may be procured from other than the hydrogen production apparatus 100d. As shown in FIG. 8, $CO_2$ recovered by the below-mentioned acidic gas separation apparatus 120 may be used. When $CO_2$ recovered by the acidic gas separation apparatus 120 is insufficient as a material for $CO_2$ reforming, the insufficient amount of $CO_2$ may be added to the $CO_2$ recovered by the acidic gas separation apparatus 120 and fed to the mixer 181c. $CH_4$ and $CO_2$ mixed by the mixer 181c are fed to the $CO_2$ reformer 182c, and the $CO_2$ reforming reaction is performed as mentioned above.

Successively, a feed gas containing the reformed gas produced by the $CO_2$ reformer 182c, unreacted $CO_2$ in the material, and water vapor added for humidification in advance is fed to the acidic gas separation apparatus 120, and separated into a mixed gas containing $CO_2$ and water vapor and a feed gas enriched with $H_2$ to give crude purified hydrogen ($H_2$ in the Figure). The composition (ratio of $CO_2$ and water vapor) of the permeate gas that permeates an acidic gas separation membrane provided in the acidic gas separation apparatus 120 can be adjusted by controlling the pressure on the permeate side.

The $CO_2$ and water vapor that have selectively permeated an acidic gas separation membrane provided in the acidic gas separation apparatus 120 are separated into liquefied water and $CO_2$ due to liquefaction of water vapor in the condenser 183a, and $CO_2$ and water are respectively recovered by the vacuum pump 184a and drainage pump 185a driven by the electric power generated by the generator 187b. The recovered $CO_2$ can be reused as a material for $CO_2$ reforming and water can be reused as necessary for humidification of the reformed gas.

In the hydrogen production apparatus 100d shown in FIG. 8, the motive power obtained by rotation of the expansion turbine 186b by the introduction of $CH_4$ may be used for driving the vacuum pump 184a or the drainage pump 185a. In the hydrogen production apparatus 100d, when the mixer 181c contains an ejector, $CH_4$ to be the material for $CO_2$ reforming ($CH_4$ with higher pressure than the pressure of water vapor reforming reaction) may be used as a driving fluid for the ejector.

(Hydrogen Production Apparatus 100e and Production Method of Hydrogen Using Same)

Figure 9:
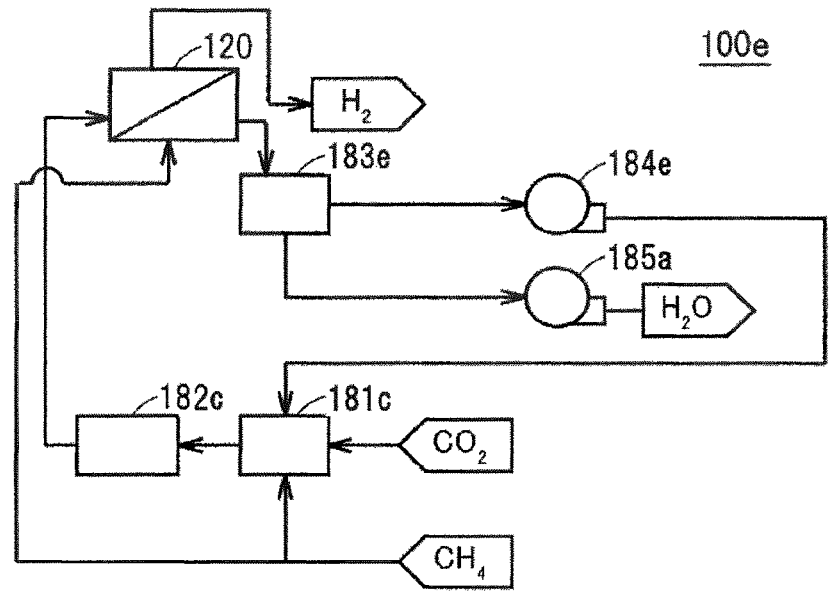
FIG. 9 is a configuration diagram schematically showing one embodiment of a hydrogen production apparatus.

The hydrogen production apparatus 100e shown in FIG. 9 is an apparatus for producing hydrogen by $CO_2$ reforming, and acidic gas membrane separation is performed by a sweep method. As the sweep gas, $CH_4$ which is the material for $CO_2$ reforming is used. In the following, the same symbols are assigned to the same members explained in the hydrogen production apparatus 100a (FIG. 5) and the like, and the explanation thereof is omitted.

The hydrogen production apparatus 100e contains mixer 181c, $CO_2$ reformer 182c for $CO_2$ reforming, acidic gas separation apparatus 120 provided with an acidic gas separation membrane module having an acidic gas separation membrane, condenser 183e, blower 184e, and drainage pump 185a. The explanation of each member other than the condenser 183e and blower 184e is the same as above.

The condenser 183e is used for separating the liquefied water and a gas containing $CO_2$ and $CH_4$ by introducing a mixed gas containing $CO_2$ and water vapor that have permeated an acidic gas separation membrane provided in the acidic gas separation apparatus 120, and a sweep gas ($CH_4$) used for the acidic gas separation apparatus 120, cooling the mixed gas, and liquefying the water vapor. The blower 184e is used for supplying the sweep gas ($CH_4$) into the acidic gas separation apparatus 120, and recovering the gas containing $CO_2$ and $CH_4$ separated by the condenser 183e.

In the hydrogen production apparatus 100e shown in FIG. 9, hydrogen can be produced as follows. First, $CH_4$ and $CO_2$, which are materials for $CO_2$ reforming, are fed to a mixer 181c. In the mixer 181c, $CO_2$ fed from other than the hydrogen production apparatus 100e, as well as a gas containing $CO_2$ recovered by the below-mentioned acidic gas separation apparatus 120 and sweep gas ($CH_4$) may be additionally supplied as shown in FIG. 9. $CH_4$ and $CO_2$ mixed in the mixer 181c are fed to a $CO_2$ reformer 182c and a $CO_2$ reforming reaction is performed.

Successively, the feed gas containing the reformed gas produced in the $CO_2$ reformer 182c, unreacted $CO_2$ in the material, and water vapor added for humidification in advance are fed to the acidic gas separation apparatus 120, and $CH_4$ as a sweep gas is also supplied to the permeate side of the acidic gas separation apparatus 120 (permeate side of acidic gas separation membrane). In the acidic gas separation apparatus 120, a mixed gas containing $CO_2$, $CH_4$ and water vapor is separated from a feed gas enriched with $H_2$, and crude purified hydrogen is obtained ($H_2$ in the Figure). The composition (ratio of $CO_2$ and water vapor) of the permeate gas that has permeated an acidic gas separation membrane provided in the acidic gas separation apparatus 120 can be adjusted by controlling the flow of the sweep gas.

$CO_2$ and water vapor that have selectively permeated an acidic gas separation membrane provided in the acidic gas separation apparatus 120 are introduced into the condenser 183e together with the sweep gas ($CH_4$), separated into liquefied water and a gas containing $CO_2$ and $CH_4$ by liquefying water vapor in the condenser 183a, the gas containing $CO_2$ and $CH_4$ is recovered by the blower 184e, and water is recovered by the drainage pump 185a. The gas containing $CO_2$ and $CH_4$ and recovered by the blower 184e can be reused as a material for $CO_2$ reforming. The water recovered by the drainage pump 185a can be used for humidification in advance of the reformed gas to be fed to the acidic gas separation apparatus 120.

In the hydrogen production apparatus 100e shown in FIG. 9, the case where the gas containing $CO_2$ and $CH_4$ and water vapor are separated using the condenser 183e is described as an example. The gas containing $CO_2$ and $CH_4$ and water vapor may also be separated using a water vapor separation membrane instead of the condenser 183e. In this case, the water vapor separated with the water vapor separation membrane may be directly used for humidification in advance of the reformed gas without liquefaction.

(Hydrogen Production Apparatus 100f and Production Method of Hydrogen Using Same)

Figure 10:
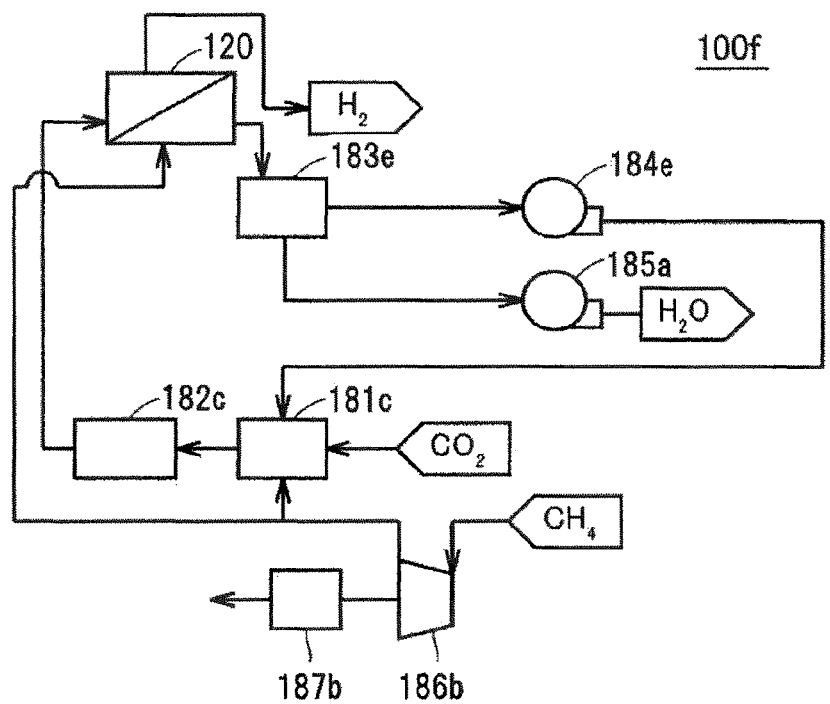
FIG. 10 is a configuration diagram schematically showing one embodiment of a hydrogen production apparatus.

The hydrogen production apparatus 100f shown in FIG. 10 is an apparatus for producing hydrogen by $CO_2$ reforming, and is different from the hydrogen production apparatus 100e shown in FIG. 9 in that $CH_4$ with a pressure higher than the pressure of the $CO_2$ reforming reaction is used as $CH_4$ as a material for $CO_2$ reforming. In the hydrogen production apparatus 100f, $CH_4$ with a pressure higher than the hydrogen production apparatus 100e is used. As a result, an electric power obtained by differential pressure power generation with $CH_4$ can be used to operate the equipment provided in the production apparatus 100f. In the following, the same symbols are assigned to the same members explained in the hydrogen production apparatus 100a (FIG. 5) and the like, and the explanation thereof is omitted.

The hydrogen production apparatus 100f shown in FIG. 10 contains mixer 181c, $CO_2$ reformer 182c, acidic gas separation apparatus 120, condenser 183e, blower 184e, drainage pump 185a, expansion turbine 186b, and generator 187b. The explanation of each of these members is the same as above.

In the hydrogen production apparatus 100f shown in FIG. 10, hydrogen can be produced as follows. First, $CH_4$ which is a material for $CO_2$ reforming is introduced into an expansion turbine 186b, whereby the expansion turbine 186b rotates to drive the generator 187b and generate power. $CH_4$ expanded and depressurized by the expansion turbine 186b is fed to the mixer 181c and mixed with $CO_2$. In mixer 181c, a gas containing $CO_2$ separated by the acidic gas separation apparatus 120 and recovered from the condenser 183e by the blower 184e and sweep gas ($CH_4$) may be additionally supplied. $CH_4$ and $CO_2$ mixed in the mixer 181c are fed to the $CO_2$ reformer 182c and a $CO_2$ reforming reaction is performed.

Successively, the feed gas containing the reformed gas produced in the $CO_2$ reformer 182c, unreacted $CO_2$ in the material, and water vapor added for humidification in advance are fed to the acidic gas separation apparatus 120, and $CH_4$ as a sweep gas is also supplied to the permeate side of the acidic gas separation apparatus 120 (permeate side of acidic gas separation membrane). In the acidic gas separation apparatus 120, a mixed gas containing $CO_2$, $CH_4$ and water vapor is separated from a feed gas enriched with $H_2$, and crude purified hydrogen is obtained ($H_2$ in the Figure). The composition (ratio of $CO_2$ and water vapor) of the permeate gas that has permeated an acidic gas separation membrane provided in the acidic gas separation apparatus 120 can be adjusted by controlling the flow of the sweep gas.

$CO_2$ and water vapor that have selectively permeated an acidic gas separation membrane provided in the acidic gas separation apparatus 120 are introduced into the condenser 183e together with the sweep gas ($CH_4$), separated into liquefied water and a gas containing $CO_2$ and $CH_4$ by liquefying water vapor in the condenser 183a, and a gas containing $CO_2$ and $CH_4$ and water are respectively recovered by the blower 184e and the drainage pump 185a driven by the electric power generated by the generator 187b. The gas containing $CO_2$ and $CH_4$ and recovered by the blower 184e can be reused as a material for $CO_2$ reforming. The water recovered by the drainage pump 185a can be used for humidification in advance of the reformed gas to be fed to the acidic gas separation apparatus 120.

In the hydrogen production apparatus 100f shown in FIG. 10, the motive power obtained by rotation of the expansion turbine 186b due to the introduction of $CH_4$ may also be used for driving blower 184e or drainage pump 185a. In the hydrogen production apparatus 100f, when the mixer 181c contains an ejector, $CH_4$ to be the material for $CO_2$ reforming ($CH_4$ with higher pressure than the pressure of water vapor reforming reaction) may be used as a driving fluid for the ejector.

(Hydrogen Production Apparatus 100g and Production Method of Hydrogen Using Same)

Figure 11:
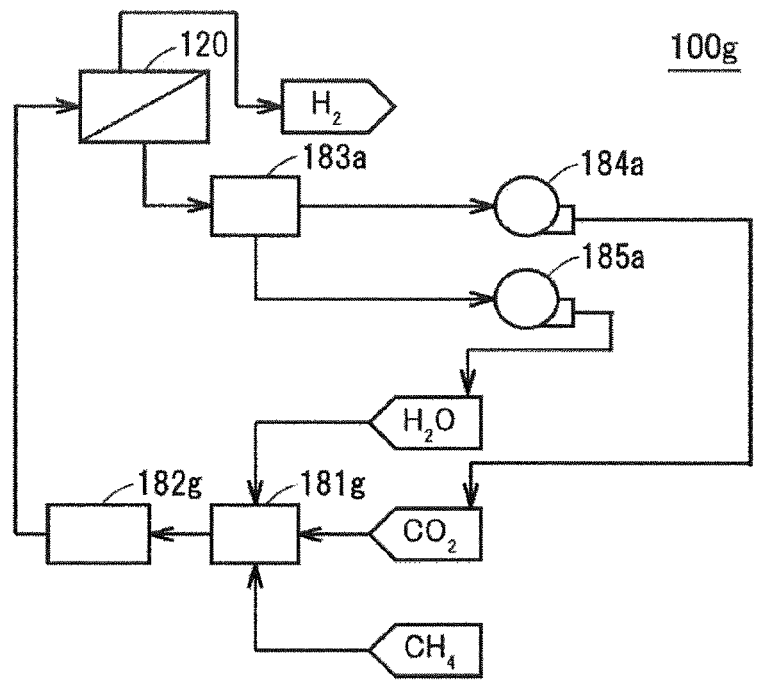
FIG. 11 is a configuration diagram schematically showing one embodiment of a hydrogen production apparatus.

The hydrogen production apparatus 100g shown in FIG. 11 is an apparatus for producing hydrogen by water vapor reforming and $CO_2$ reforming, and acidic gas membrane separation is performed by a reduced pressure method. In the following, the same symbols are assigned to the same members explained in the hydrogen production apparatus 100a (FIG. 5) and the like, and the explanation thereof is omitted.

The hydrogen production apparatus 100g shown in FIG. 11 contains mixer 181g, reformer 182g for water vapor reforming and $CO_2$ reforming, acidic gas separation apparatus 120 provided with an acidic gas separation membrane module having an acidic gas separation membrane, condenser 183a, vacuum pump 184a, and drainage pump 185a. The explanation of each member other than the mixer 181g and reformer 182g is the same as above.

The mixer 181g is used to feed $CH_4$, water vapor, and $CO_2$, which are materials for water vapor reforming and $CO_2$ reforming, to the reformer 182g. Examples of the mixer 181g include mixer, vaporizer, sprayer, ejector, a combination of two or more of these, and the like.

The reformer 182g is used to perform water vapor reforming and $CO_2$ reforming by using $CH_4$, water vapor, and $CO_2$ fed by the mixer 181g. The reformer 182g can perform water vapor reforming shown by the above-mentioned reaction formula (II) and $CO_2$ reforming shown by the above-mentioned reaction formula (IV), and CO conversion reaction shown by the above-mentioned reaction formula (III) may be further performed. In this way, $CH_4$ can be reformed into $H_2$ and CO, and CO can be further converted to $CO_2$ and $H_2$.

In the hydrogen production apparatus 100g shown in FIG. 11, hydrogen can be produced as follows. First, $CH_4$, water vapor (or water), and $CO_2$, which are materials for water vapor reforming and $CO_2$ reforming, are fed to a mixer 181a. The water vapor (or water), and $CO_2$ fed to the mixer 181g are not particularly limited as long as they are suitable as materials for water vapor reforming and $CO_2$ reforming, and may be procured from other than the hydrogen production apparatus 100g. As shown in FIG. 11, water and $CO_2$ recovered by the below-mentioned acidic gas separation apparatus 120 may be used. When water and $CO_2$ recovered by the acidic gas separation apparatus 120 are insufficient as materials for water vapor reforming and $CO_2$ reforming, the insufficient amount of water and $CO_2$ may be added to the water and $CO_2$ recovered by the acidic gas separation apparatus 120 and fed to the mixer 181g. The $CH_4$, water vapor and $CO_2$ adjusted by the mixer 181g are fed to the reformer 182g, and the above-mentioned water vapor reforming reaction (reaction formula (II)) and the $CO_2$ reforming reaction (reaction formula (IV)) are performed, whereby $H_2$ and $CO_2$ are produced as reformed gas. Furthermore, when a CO conversion reaction (reaction formula (III)) is performed by the reformer 182g, $CO_2$ is additionally produced.

The reformed gas produced by the $CO_2$ reformer 182g is fed to the acidic gas separation apparatus 120. In the acidic gas separation apparatus 120, a feed gas containing water vapor (unreacted water vapor in the material) as well as a reformed gas is introduced. The acidic gas separation membrane provided in the acidic gas separation apparatus 120 can selectively permeate $CO_2$ and water vapor. Therefore, a mixed gas containing $CO_2$ and water vapor and the feed gas enriched with $H_2$ can be separated, and crude purified hydrogen can be obtained ($H_2$ in the Figure). The composition of the permeate gas (ratio of $CO_2$ and water vapor) that permeates the acidic gas separation membrane provided in the acidic gas separation apparatus 120 can be adjusted by controlling the pressure on the permeate side.

The $CO_2$ and water vapor that selectively permeated the acidic gas separation membrane provided in the acidic gas separation device 120 are separated into liquefied water and $CO_2$ by liquefying the water vapor in the condenser 183a, and $CO_2$ is recovered by the vacuum pump 184a, and water is recovered by the drainage pump 185a. The $CO_2$ recovered by the vacuum pump 184a can be reused as a material for $CO_2$ reforming. In addition, the water recovered by the drainage pump 185a can be reused as a material for water vapor reforming.

In the hydrogen production apparatus 100g shown in FIG. 11, a case where $CO_2$ and water vapor are separated by using a condenser 183a is described as an example. The $CO_2$ and water vapor may also be separated by using a water vapor separation membrane instead of the condenser 183a. In this case, the water vapor separated by the water vapor separation membrane may be directly fed to the mixer 181g without liquefaction.

(Hydrogen Production Apparatus 100h and Production Method of Hydrogen Using Same)

Figure 12:
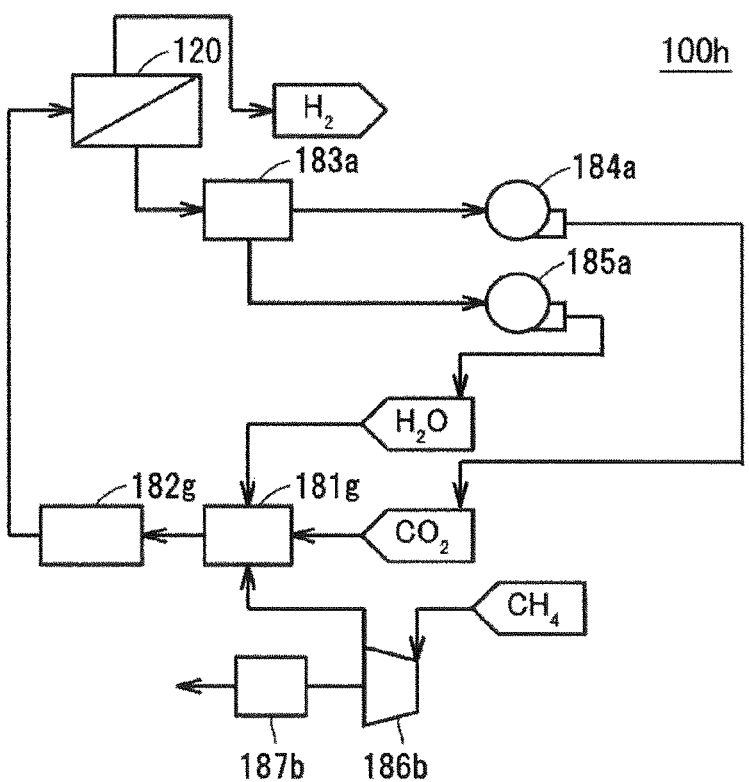
FIG. 12 is a configuration diagram schematically showing one embodiment of a hydrogen production apparatus.

The hydrogen production apparatus 100h shown in FIG. 12 is an apparatus for producing hydrogen by water vapor reforming and $CO_2$ reforming, and is different from the hydrogen production apparatus 100g shown in FIG. 11 in that $CH_4$ with a pressure higher than the pressure of the water vapor reforming reaction and $CO_2$ reforming reaction is used as $CH_4$ as a material for water vapor reforming and $CO_2$ reforming. In the hydrogen production apparatus 100h, $CH_4$ with a pressure higher than the hydrogen production apparatus 100g is used. As a result, an electric power obtained by differential pressure power generation with $CH_4$ can be used to operate the equipment provided in the production apparatus 100h. In the following, the same symbols are assigned to the same members explained in the hydrogen production apparatus 100a (FIG. 5) and the like, and the explanation thereof is omitted.

The hydrogen production apparatus 100h shown in FIG. 12 contains mixer 181g, reformer 182g, acidic gas separation apparatus 120, condenser 183a, vacuum pump 184a, drainage pump 185a, expansion turbine 186b, and generator 187b. The explanation of each of these members is the same as above.

In the hydrogen production apparatus 100h shown in FIG. 12, hydrogen can be produced as follows. First, $CH_4$ which is a material for water vapor reforming is introduced into an expansion turbine 186b, whereby the expansion turbine 186b rotates to drive the generator 187b and the power is generated by the generator 187b. $CH_4$ expanded and depressurized by the expansion turbine 186b is fed to the mixer 181g. $CH_4$, water vapor, and $CO_2$ adjusted by the mixer 181g are fed to the reformer 182g, and water vapor reforming reaction and $CO_2$ reforming reaction are performed, whereby $H_2$ and $CO_2$ are produced as reformed gas. Furthermore, when a CO conversion reaction (reaction formula (III)) is performed by the reformer 182g, $CO_2$ is additionally produced.

Successively, a feed gas containing the reformed gas produced by the $CO_2$ reformer 182c, and water vapor (unreacted water vapor the material) is fed to the acidic gas separation apparatus 120, and separated into a mixed gas containing $CO_2$ and water vapor and a feed gas enriched with $H_2$ to give crude purified hydrogen ($H_2$ in the Figure). The composition (ratio of $CO_2$ and water vapor) of the permeate gas that permeates an acidic gas separation membrane provided in the acidic gas separation apparatus 120 can be adjusted by controlling the pressure on the permeate side.

The $CO_2$ and water vapor that have selectively permeated an acidic gas separation membrane provided in the acidic gas separation apparatus 120 are separated into liquefied water and $CO_2$ due to liquefaction of water vapor in the condenser 183a, and $CO_2$ and water are respectively recovered by the vacuum pump 184a and drainage pump 185a driven by the electric power generated by the generator 187b. The $CO_2$ recovered by the vacuum pump 184a can be reused as a material for $CO_2$ reforming and water recovered by the drainage pump 185a can be reused as a material for water vapor reforming.

In the hydrogen production apparatus 100h shown in FIG. 12, the motive power obtained by rotation of the expansion turbine 186b by the introduction of $CH_4$ may be used for driving vacuum pump 184a or drainage pump 185a. In the hydrogen production apparatus 100h, when the mixer 181g contains an ejector, $CH_4$ to be the material for water vapor reforming ($CH_4$ with higher pressure than the pressure of water vapor reforming reaction and $CO_2$ reforming reaction) may be used as a driving fluid for the ejector.

(Hydrogen Production Apparatus 100i and Production Method of Hydrogen Using Same)

Figure 13:
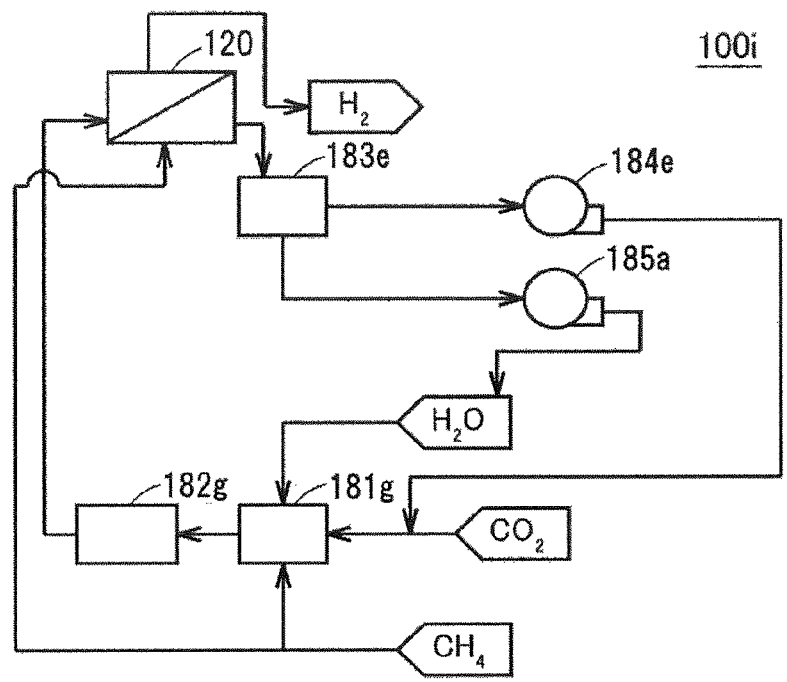
FIG. 13 is a configuration diagram schematically showing one embodiment of a hydrogen production apparatus.

The hydrogen production apparatus 100i shown in FIG. 13 is an apparatus for producing hydrogen by water vapor reforming and $CO_2$ reforming, and acidic gas membrane separation is performed by a sweep method. In the following, the same symbols are assigned to the same members explained in the hydrogen production apparatus 100a (FIG. 5) and the like, and the explanation thereof is omitted.

The hydrogen production apparatus 100i shown in FIG. 13 contains mixer 181g, reformer 182g for water vapor reforming and $CO_2$ reforming, acidic gas separation apparatus 120 provided with an acidic gas separation membrane module having an acidic gas separation membrane, condenser 183e, blower 184e, and drainage pump 185a.

In the hydrogen production apparatus 100i shown in FIG. 13, hydrogen can be produced as follows. First, $CH_4$, water vapor (or water), and $CO_2$, which are materials for water vapor reforming and $CO_2$ reforming, are fed to a mixer 181g. In the mixer 181g, water or $CO_2$ fed from other than the hydrogen production apparatus 100i, as well as a gas containing water or $CO_2$ recovered by the below-mentioned acidic gas separation apparatus 120 and a sweep gas ($CH_4$) may be additionally supplied as shown in FIG. 13. The $CH_4$, water vapor and $CO_2$ adjusted by the mixer 181g are fed to the reformer 182g, and the water vapor reforming reaction and the $CO_2$ reforming reaction are performed, whereby $H_2$ and $CO_2$ are produced as reformed gas. Furthermore, when a CO conversion reaction (reaction formula (III)) is performed by the reformer 182g, $CO_2$ is additionally produced.

Successively, a feed gas containing the reformed gas produced by the $CO_2$ reformer 182c, and water vapor (unreacted water vapor the material) is fed to the acidic gas separation apparatus 120, and $CH_4$ as a sweep gas is also supplied to the permeate side of the acidic gas separation apparatus 120 (permeate side of acidic gas separation membrane). In the acidic gas separation apparatus 120, a mixed gas containing $CO_2$ and water vapor and a feed gas enriched with $H_2$ are separated to give crude purified hydrogen ($H_2$ in the Figure). The composition (ratio of $CO_2$ and water vapor) of the permeate gas that permeates an acidic gas separation membrane provided in the acidic gas separation apparatus 120 can be adjusted by controlling the flow of the sweep gas.

$CO_2$ and water vapor that have selectively permeated an acidic gas separation membrane provided in the acidic gas separation apparatus 120 are introduced into the condenser 183e together with the sweep gas ($CH_4$), separated into liquefied water and a gas containing $CO_2$ and $CH_4$ by liquefying water vapor in the condenser 183a, the gas containing $CO_2$ and $CH_4$ is recovered by the blower 184e, and water is recovered by the drainage pump 185a. The gas containing $CO_2$ and $CH_4$ and recovered by the blower 184e can be reused as a material for water vapor reforming and $CO_2$ reforming. The water recovered by the drainage pump 185a can be reused as a material for water vapor reforming.

In the hydrogen production apparatus 100i shown in FIG. 13, a case where a gas containing $CO_2$ and $CH_4$ and water vapor are separated by using a condenser 183e is described as an example. The gas containing $CO_2$ and $CH_4$ and water vapor may also be separated by using a water vapor separation membrane instead of the condenser 183e. In this case, the water vapor separated by the water vapor separation membrane may be directly fed to the mixer 181g without liquefaction.

(Hydrogen Production Apparatus 100j and Production Method of Hydrogen Using Same)

Figure 14:
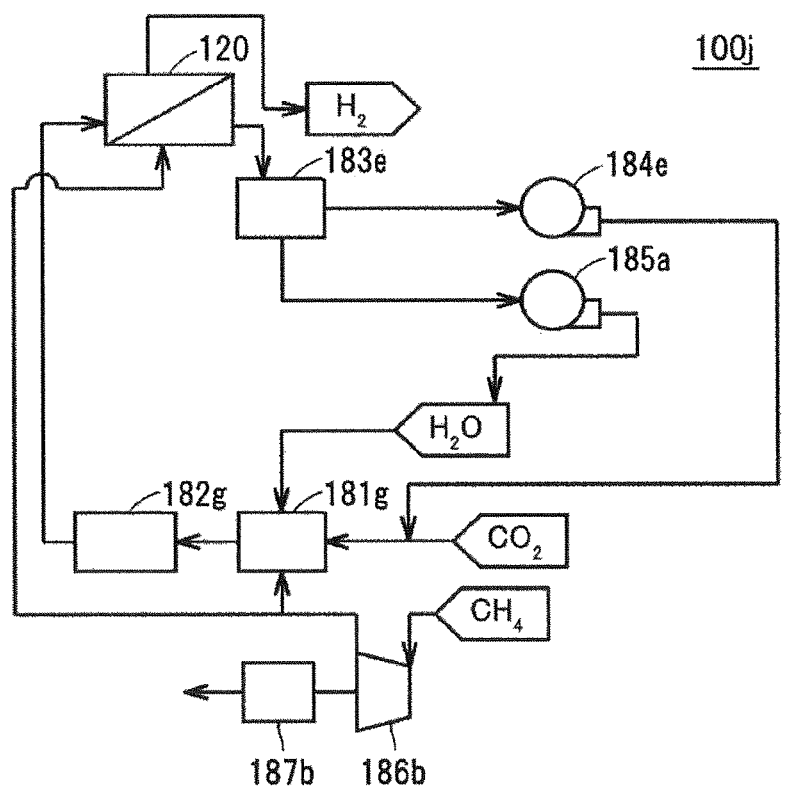
FIG. 14 is a configuration diagram schematically showing one embodiment of a hydrogen production apparatus.

The hydrogen production apparatus 100j shown in FIG. 14 is an apparatus for producing hydrogen by water vapor reforming and $CO_2$ reforming, and is different from the hydrogen production apparatus 100i shown in FIG. 13 in that $CH_4$ with a pressure higher than the pressure of the water vapor reforming and $CO_2$ reforming reactions is used as $CH_4$ as a material for water vapor reforming and $CO_2$ reforming. In the hydrogen production apparatus 100j, $CH_4$ with a pressure higher than the hydrogen production apparatus 100i is used. As a result, an electric power obtained by differential pressure power generation with $CH_4$ can be used to operate the equipment provided in the production apparatus 100j. In the following, the same symbols are assigned to the same members explained in the hydrogen production apparatus 100a (FIG. 5) and the like, and the explanation thereof is omitted.

The hydrogen production apparatus 100j shown in FIG. 14 contains mixer 181g, reformer 182g, acidic gas separation apparatus 120, condenser 183e, blower 184e, drainage pump 185a, expansion turbine 186b, and generator 187b. The explanation of each of these members is the same as above.

In the hydrogen production apparatus 100j shown in FIG. 14, hydrogen can be produced as follows. First, $CH_4$ which is a material for water vapor reforming is introduced into an expansion turbine 186b, whereby the expansion turbine 186b rotates to drive the generator 187b and the power is generated. $CH_4$ expanded and depressurized by the expansion turbine 186b is fed to the mixer 181g. The water vapor (or water), and $CO_2$ fed to the mixer 181g may be procured from other than the hydrogen production apparatus 100j. As shown in FIG. 14, a gas containing water and $CO_2$ which are recovered by the below-mentioned acidic gas separation apparatus 120, and sweep gas may also be used. $CH_4$, water vapor, and $CO_2$ adjusted by the mixer 181g are fed to the reformer 182g, and at least water vapor reforming reaction and $CO_2$ reforming reaction are performed.

Successively, a feed gas containing the reformed gas produced by the reformer 182c, and water vapor (unreacted water vapor the material) is fed to the acidic gas separation apparatus 120, and $CH_4$ as a sweep gas is also supplied to the permeate side of the acidic gas separation apparatus 120 (permeate side of acidic gas separation membrane). In the acidic gas separation apparatus 120, a mixed gas containing $CO_2$, $CH_4$, and water vapor and a feed gas enriched with $H_2$ are separated to give crude purified hydrogen ($H_2$ in the Figure). The composition (ratio of $CO_2$ and water vapor) of the permeate gas that permeates an acidic gas separation membrane provided in the acidic gas separation apparatus 120 can be adjusted by controlling the flow of the sweep gas.

$CO_2$ and water vapor that have selectively permeated an acidic gas separation membrane provided in the acidic gas separation apparatus 120 are introduced into the condenser 183e together with the sweep gas ($CH_4$), separated into liquefied water and a gas containing $CO_2$ and $CH_4$ by liquefying water vapor in the condenser 183a, the gas containing $CO_2$ and $CH_4$ is recovered by the blower 184e, and water is recovered by the drainage pump 185a. The gas containing $CO_2$ and $CH_4$ recovered by the blower 184e can be reused as a material for vapor reforming and $CO_2$ reforming. The water recovered by the drainage pump 185a can be reused as a material for water vapor reforming.

In the hydrogen production apparatus 100j shown in FIG. 14, the motive power obtained by rotation of the expansion turbine 186b by the introduction of $CH_4$ may be used for driving the blower 184e or the drainage pump 185a. In the hydrogen production apparatus 100j, when the mixer 181g contains an ejector, $CH_4$ to be the material for water vapor reforming ($CH_4$ with higher pressure than the pressure of water vapor reforming reaction) may be used as a driving fluid for the ejector.

The above-mentioned hydrogen production apparatuses 100a-100j and the production methods of hydrogen using same can be used for fuel cell systems using hydrogen contained in a reformed gas produced by a hydrocarbon reforming reaction as a fuel.

EXAMPLE

The present invention is explained in more detail in the following by referring to Examples, which do not limit the present invention. It is also possible to carry out the present invention by making appropriate modifications within the range that can conform to the above and the following gist, all of which are encompassed in the technical scope of the present invention.

Example 1

Water (172.33 parts by weight), chemically crosslinked polyacrylic acid (manufactured by Sumitomo Seika Chemicals Company, Limited, trade name: AQUPEC HV-501E, ion exchange capacity: 13.9 mmoleq/g)(4 parts by weight), and non-crosslinked polyacrylic acid (manufactured by Sumitomo Seika Chemicals Company, Limited, trade name: AQUPAANA AP-40F (40% Na saponification), ion exchange capacity: 12.4 mmoleq/g)(0.8 parts by weight) were added to a material tank and mixed to give a dispersion. To the dispersion was added and mixed 50 wt % cesium hydroxide aqueous solution (manufactured by Rockwood Lithium Japan K.K.)(28.80 parts by weight). L-proline (manufactured by Tokyo Chemical Industry Co., Ltd.)(11.05 parts by weight) and 10 wt % surfactant (manufactured by AGC Seimi Chemical Co., Ltd., trade name: Surflon S-242) aqueous solution (1.2 parts by weight) were added and mixed to give a coating liquid (amount of water in the coating liquid: 86.1 wt %). The obtained coating liquid was defoamed using a defoaming apparatus (manufactured by THINKY CORPORATION, trade name: planetary centrifugal mixer AWATORI RENTARO ARE-310).

The defoamed coating liquid was applied at 20-25° C. to one surface of a hydrophobic PTFE porous membrane (manufactured by Sumitomo Electric Fine Polymer, Inc., trade name: Poreflon HP-010-50, thickness: 50 µm, average pore diameter: 0.1 µm, porosity: 73% by volume, contact angle of water at 25° C.: 113 degrees) to be used as a first porous layer to form a film of the coating liquid.

Successively, a hydrophobic PTFE porous membrane same as the above-mentioned first porous layer was laminated as a second porous layer on the coating liquid film formed on the first porous layer to give a laminated body. The laminated body was dried in a thermostatic chamber at 100° C. for about 15 min to form a composition membrane (thickness: 50 µm, amount of water in the composition membrane: not more than 50 wt %), whereby an acidic gas separation membrane was obtained.

Example 2

Water (204.63 parts by weight), chemically crosslinked polyacrylic acid (manufactured by Sumitomo Seika Chemicals Company, Limited, trade name: AQUPEC HV-501E, ion exchange capacity: 13.9 mmoleq/g)(4.41 parts by weight), and non-crosslinked polyacrylic acid (manufactured by Sumitomo Seika Chemicals Company, Limited, trade name: AQUPAANA AP-40F (40% Na saponification), ion exchange capacity: 12.4 mmoleq/g)(0.88 parts by weight) were added to a material tank and mixed to give a dispersion. To the dispersion was added and mixed 50 wt % cesium hydroxide aqueous solution (manufactured by Rockwood Lithium Japan K.K.)(31.10 parts by weight). Sarcosine (manufactured by Tokyo Chemical Industry Co., Ltd.)(9.63 parts by weight) and 10 wt % surfactant (manufactured by AGC Seimi Chemical Co., Ltd., trade name: Surflon S-242) aqueous solution (1.34 parts by weight) were added and mixed to give a coating liquid (amount of water in the coating liquid: 87.9 wt %). The obtained coating liquid was defoamed using a defoaming apparatus (manufactured by THINKY CORPORATION, trade name: planetary centrifugal mixer AWATORI RENTARO ARE-310).

The defoamed coating liquid was applied at 20-25° C. to one surface of a hydrophobic PTFE porous membrane (manufactured by Sumitomo Electric Fine Polymer, Inc., trade name: Poreflon HP-010-50, thickness: 50 µm, average pore diameter: 0.1 µm, porosity: 73% by volume, contact angle of water at 25° C.: 113 degrees) to be used as a first porous layer to form a film of the coating liquid.

Successively, a hydrophobic PTFE porous membrane same as the above-mentioned first porous layer was laminated as a second porous layer on the coating liquid film formed on the first porous layer to give a laminated body. The laminated body was dried in a thermostatic chamber at 100° C. for about 15 min to form a composition membrane (thickness: 30 µm, amount of water in the composition membrane: not more than 50 wt %), whereby an acidic gas separation membrane was obtained.

Comparative Example 1

Water (170.92 parts by weight), chemically crosslinked polyacrylic acid (manufactured by Sumitomo Seika Chemicals Company, Limited, trade name: AQUPEC HV-501E, ion exchange capacity: 13.9 mmoleq/g)(4 parts by weight), and non-crosslinked polyacrylic acid (manufactured by Sumitomo Seika Chemicals Company, Limited, trade name: AQUPAANA AP-40F (40% Na saponification), ion exchange capacity: 12.4 mmoleq/g)(0.8 parts by weight) were added to a material tank and mixed to give a dispersion. To the dispersion was added and mixed 50 wt % cesium hydroxide aqueous solution (manufactured by Rockwood Lithium Japan K.K.)(38.09 parts by weight). A 10 wt % sodium telluride aqueous solution (3.18 parts by weight) and 10 wt % surfactant (manufactured by ACC Seimi Chemical Co., Ltd., trade name: Surflon S-242) aqueous solution (1.2 parts by weight) were added and mixed to give a coating liquid (amount of water in the coating liquid: 87.6 wt %). The obtained coating liquid was defoamed using a defoaming apparatus (manufactured by THINKY CORPORATION, trade name: planetary centrifugal mixer AWATORI RENTARO ARE-310).

The defoamed coating liquid was applied at 20-25° C. to one surface of a hydrophobic PTFE porous membrane (manufactured by Sumitomo Electric Fine Polymer, Inc., trade name: Poreflon HP-010-50, thickness: 50 µm, average pore diameter: 0.1 µm, porosity: 73% by volume, contact angle of water at 25° C.: 113 degrees) to be used as a first porous layer to form a film of the coating liquid.

Successively, a hydrophobic PTFE porous membrane same as the above-mentioned first porous layer was laminated as a second porous layer on the coating liquid film formed on the first porous layer to give a laminated body. The laminated body was dried in a thermostatic chamber at 100° C. for about 15 min to form a composition membrane (thickness: 50 µm, amount of water in the composition membrane: not more than 50 wt %), whereby an acidic gas separation membrane was obtained.

Comparative Example 2

Water (166.73 parts by weight), chemically crosslinked polyacrylic acid (manufactured by Sumitomo Seika Chemicals Company, Limited, trade name: AQUPEC HV-501E, ion exchange capacity: 13.9 mmoleq/g)(4 parts by weight), and non-crosslinked polyacrylic acid (manufactured by Sumitomo Seika Chemicals Company, Limited, trade name:

AQUPAANA AP-40F (40% Na saponification), ion exchange capacity: 12.4 mmoleq/g)(0.8 parts by weight) were added to a material tank and mixed to give a dispersion. To the dispersion was added and mixed 50 wt % cesium hydroxide aqueous solution (manufactured by Rockwood Lithium Japan K.K.)(38.09 parts by weight). L-proline (manufactured by Tokyo Chemical Industry Co., Ltd.)(7.37 parts by weight) and 10 wt % surfactant (manufactured by AGC Seimi Chemical Co., Ltd., trade name: Surflon S-242) aqueous solution (1.2 parts by weight) were added and mixed to give a coating liquid (amount of water in the coating liquid: 85.6 wt %). The obtained coating liquid was defoamed using a defoaming apparatus (manufactured by THINKY CORPORATION, trade name: planetary centrifugal mixer AWATORI RENTARO ARE-310).

The defoamed coating liquid was applied at 20-25° C. to one surface of a hydrophobic PTFE porous membrane (manufactured by Sumitomo Electric Fine Polymer, Inc., trade name: Poreflon HP-010-50, thickness: 50 µm, average pore diameter: 0.1 µm, porosity: 73% by volume, contact angle of water at 25° C.: 113 degrees) to be used as a first porous layer to form a film of the coating liquid.

Successively, a hydrophobic PTFE porous membrane same as the above-mentioned first porous layer was laminated as a second porous layer on the coating liquid film formed on the first porous layer to give a laminated body. The laminated body was dried in a thermostatic chamber at 100° C. for about 15 min to form a composition membrane (thickness: 30 µm, amount of water in the composition membrane: not more than 50 wt %), whereby an acidic gas separation membrane was obtained.

Experimental Example 1: Sweep Conditions

Figure 15:
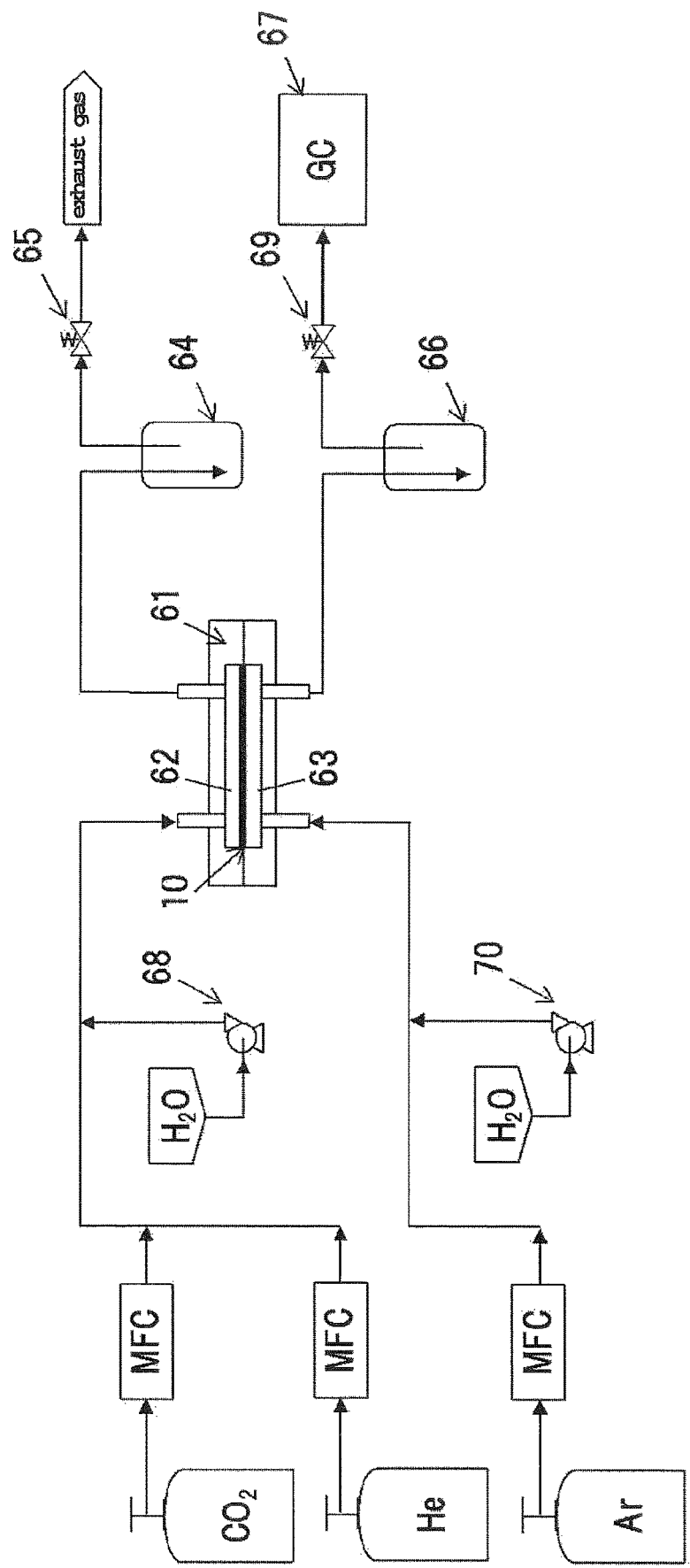
FIG. 15 is a configuration diagram schematically showing the acidic gas separation apparatus used in Experimental Example 1.

Using an acidic gas separation apparatus provided with an acidic gas separation membrane cell 61 as shown in FIG. 15, $CO_2$ permeance and He permeance of the acidic gas separation membranes of Examples 1 and 2 and Comparative Examples 1 and 2 were measured. To be specific, the produced acidic gas separation membranes were cut into an appropriate size with a flat membrane shape, and fixed between a feed-side chamber 62 and a permeate-side chamber 63 of the acidic gas separation membrane cell 61 made of stainless steel. The temperature of the acidic gas separation membrane cell was set to 93° C. by a thermostatic chamber. A feed gas ($CO_2$: 13.6% by volume, He: 67.7% by volume, $H_2O$: 18.7% by volume) was fed at a flow of 338.7 NmL/min to the feed-side chamber 62 of the acidic gas separation membrane cell 61. In addition, a sweep gas (Ar: 88.2% by volume, $H_2O$: 11.8% by volume) was supplied at a flow of 31.6 NmL/min to the permeate-side chamber 63 of the acidic gas separation membrane cell 61. $H_2O$ was adjusted to have the above-mentioned mixing ratio by feeding water by metering pumps 68 and 70, and evaporating same by heating. The pressure of the feed-side chamber 62 was adjusted to 125 kPa (absolute pressure) by a back pressure controller 65 provided on the downstream side of a cold trap 64 in the middle of an exhaust path for retentate gas. A back pressure controller 69 was also provided between a cold trap 66 and a gas chromatograph 67 to adjust the pressure on the permeate-side chamber 63 to the atmospheric pressure.

When the acidic gas separation apparatus reached a steady state after starting the operation thereof, the water vapor contained in the permeate gas discharged from the permeate-side chamber 63 was removed by the cold trap 66, and the resulting permeate gas was analyzed by the gas chromatograph 67. The $CO_2$ permeance ($mol/(m^2 \times sec \times kPa)$) and He permeance ($mol/(m^2 \times sec \times kPa)$) were calculated, and the $CO_2$/He separation factor was calculated from the obtained value and according to the following formula:

$$CO_2/He\ separation\ factor = CO_2\ permeance\ (mol/(m^2 \times sec \times kPa))/He\ permeance\ (mol/(m^2 \times sec \times kPa)).$$

The results are shown in Table 1. Table 1 also shows the kinds and amounts of components (A)-(C), and β values. The acidic gas separation membrane in Comparative Example 2 was broken in the middle of Experimental Example 1, and the $CO_2$/He separation factor could not be measured.

TABLE 1

| | component (A) | | component (B) | | component (C) | | | $CO_2$/He |
|---|---|---|---|---|---|---|---|---|
| | kind | amount (mol) | kind | amount (wt %) | kind | amount (mol) | β | separation factor |
| Example 1 | cesium hydroxide | 1.47 | chemically crosslinked polyacrylic acid non-crosslinked polyacrylic acid | 15.8 | L-proline | 1.47 | 0.32 | 128 |
| Example 2 | cesium hydroxide | 1.44 | chemically crosslinked polyacrylic acid non-crosslinked polyacrylic acid | 17.3 | sarcosine | 1.50 | 0.29 | 225 |
| Comparative Example 1 | cesium hydroxide | 1.94 | chemically crosslinked polyacrylic acid non-crosslinked polyacrylic acid | 17.7 | — | — | — | 7.0 |
| Comparative Example 2 | cesium hydroxide | 1.94 | chemically crosslinked polyacrylic acid non-crosslinked polyacrylic acid | 15.3 | L-proline | 0.98 | 0.96 | unmeasurable |

(note)
(1) The results of $CO_2$/He separation factor obtained in Experimental Example 1 are shown.
(2) The amounts (mol) of components (A) and (C) are based on 1 mol of an acidic dissociative group in component (B).
(3) The amount (wt %) of component (B) is based on the solid content of the composition.
(4) In Comparative Example 1, sodium telluride was used instead of component (C) (compound having an acidic dissociative group and an amino group).

Experimental Example 2: Reduced Pressure Conditions

Figure 16:
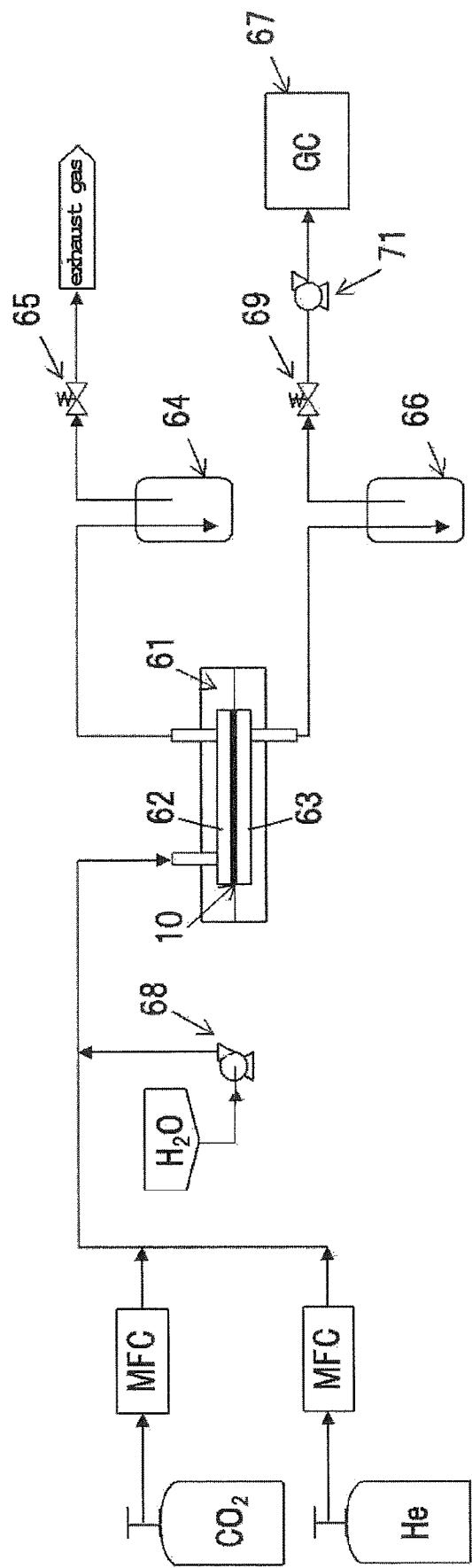
FIG. 16 is a configuration diagram schematically showing the acidic gas separation apparatus used in Experimental Example 2.

Using an acidic gas separation apparatus provided with an acidic gas separation membrane cell 61 as shown in FIG. 16, $CO_2$ permeance and He permeance of the acidic gas separation membranes of Example 1 were measured. To be specific, the produced acidic gas separation membrane was cut in an appropriate size with a flat membrane shape. This was fixed between a feed-side chamber 62 and a permeate-side chamber 63 of the acidic gas separation membrane cell 61 made of a stainless steel. The temperature of the acidic gas separation membrane cell was set to 93° C. by a thermostatic chamber. A feed gas ($CO_2$: 13.6% by volume, He: 28.0% by volume, $H_2O$: 58.4% by volume) was fed at a flow of 660.8 NmL/min to a feed-side chamber 62 of the acidic gas separation membrane cell 61. $H_2O$ was adjusted to have the above-mentioned mixing ratio by feeding water by a metering pump 68, and evaporating same by heating. The pressure of the feed-side chamber 62 was adjusted to 125 kPa (absolute pressure) by a back pressure controller 65 provided on the downstream side of a cold trap 64 in the middle of an exhaust path for retentate gas. A back pressure controller 69 and a vacuum pump 71 were also provided between a cold trap 66 and a gas chromatograph 67 to adjust the pressure on the permeate-side chamber 63 to 20 kPaA.

When the acidic gas separation apparatus reached a steady state after starting operation thereof, water vapor contained in the permeate gas discharged from the permeate-side chamber was removed by the cold trap 66, and the resulting permeate gas was analyzed by the gas chromatograph 67. The $CO_2$ permeance (mol/($m^2 \times sec \times kPa$)) and He permeance (mol/($m^2 \times sec \times kPa$)) were calculated, and the $CO_2$/He separation factor was calculated from the obtained value and according to the following formula:

$CO_2$/He separation factor=$CO_2$ permeance (mol/($m^2 \times sec \times kPa$))/He permeance (mol/($m^2 \times sec \times kPa$)).

The results are shown in Table 2. Table 2 also shows the kinds and amounts of components (A)-(C), and β values.

TABLE 2

| | component (A) | | component (B) | | component (C) | | | $CO_2$/He |
|---|---|---|---|---|---|---|---|---|
| | kind | amount (mol) | kind | amount (wt %) | kind | amount (mol) | β | separation factor |
| Example 1 | cesium hydroxide | 1.47 | chemically crosslinked polyacrylic acid non-crosslinked polyacrylic acid | 15.8 | L-proline | 1.47 | 0.32 | 469 |

(note)
(1) The results of $CO_2$/He separation factor obtained in Experimental Example 2 are shown.
(2) The amounts (mol) of components (A) and (C) are based on 1 mol of an acidic dissociative group in component (B).
(3) The amount (wt %) of component (B) is based on the solid content of the composition.

INDUSTRIAL APPLICABILITY

The composition of the present invention is useful for producing an acidic gas separation membrane.

This application is based on a patent application No. 2018-172248 filed in Japan, the contents of which are incorporated in full herein.

EXPLANATION OF SYMBOLS 1 acidic gas separation membrane element
3 feed-side flow path member
4 permeate-side flow path member
5 central tube
5a, 5b edges of central tubes
10 acidic gas separation membrane
20, 20' acidic gas separation membrane modules
21 mixed gas-feed part
22 retentate gas-exhaust part
23 permeate gas-exhaust part
24 partition
25 feed-side edge of acidic gas separation membrane element
26 exhaust-side edge of acidic gas separation membrane element
27, 27' housing
28 closure member
29a connecting part
29b blocking part
30 sweep gas-supply part
41 blocking member
42 partition member
43 hole in central tube
61 acidic gas separation membrane cell
62 feed-side chamber
63 permeate-side chamber
64 cold trap
65 back pressure controller
66 cold trap
67 gas chromatograph
68 metering pump
69 back pressure controller
70 metering pump
71 vacuum pump
100a-100j hydrogen production apparatuses
120 acidic gas separation apparatus
181a, 181c, 181g mixers
182a water vapor reformer
182c carbon dioxide ($CO_2$) reformer
182g reformer
183a, 183e condensers
184a vacuum pump
184e blower
185a drainage pump
186b expansion turbine
187b generator

The invention claimed is:
1. A composition comprising the following components (A)-(C):
(A) an alkali metal compound,
(B) a polymer having an acidic dissociative group, and

(C) a compound having an acidic dissociative group and an amino group, and having β of more than 0.0 and not more than 0.90 as calculated by the following formula (I):

$$\beta = \{\text{amount (mol) of alkali metal in component } (A) - \text{amount (mol) of acidic dissociative group in component } (B)\}/\text{amount (mol) of acidic dissociative group in component } (C) \quad (I).$$

2. The composition according to claim 1, wherein said β is not less than 0.05.

3. The composition according to claim 1, wherein said component (B) comprises a water-absorbing crosslinked polymer having an acidic dissociative group.

4. The composition according to claim 3, wherein said component (B) comprises a non-crosslinked polymer having an acidic dissociative group.

5. The composition according to claim 1, wherein the composition is used to produce an acidic gas separation membrane.

6. An acidic gas separation membrane comprising the composition according to claim 1.

7. An acidic gas separation membrane element comprising the acidic gas separation membrane according to claim 6.

8. The acidic gas separation membrane element according to claim 7, comprising
a laminated body comprising the acidic gas separation membrane and at least one of a feed-side flow path member and a permeate-side flow path member, and
a hollow tube with plural holes formed on a wall, and having a structure wherein the laminated body is wound around the hollow tube.

9. An acidic gas separation membrane module comprising the acidic gas separation membrane element according to claim 7.

10. The acidic gas separation membrane module according to claim 9, comprising
at least one acidic gas separation membrane element,
a mixed gas-feed part for feeding a mixed gas to the acidic gas separation membrane,
a retentate gas-exhaust part for exhausting a retentate gas that did not pass through the acidic gas separation membrane, and
a permeate gas-exhaust part for exhausting a permeate gas that passed through the acidic gas separation membrane.

11. An acidic gas separation apparatus comprising at least one acidic gas separation membrane module according to claim 9.

12. The acidic gas separation apparatus according to claim 11, further comprising at least one of a means of reducing the pressure of the permeate gas, and a means of supplying a sweep gas that is exhausted together with the permeate gas, wherein
the means of reducing the pressure of the permeate gas communicates with a permeate gas-exhaust part of the acidic gas separation membrane module, and
the means of supplying a sweep gas communicates with a sweep gas-supply part of the acidic gas separation membrane module.

13. A method for producing an acidic gas separation membrane comprising
a step of preparing a coating liquid by mixing the following components (A)-(C):
(A) an alkali metal compound,
(B) a polymer having an acidic dissociative group, and
(C) a compound having an acidic dissociative group and an amino group, and
a medium,
a step of applying the coating liquid on a porous layer to form a film of the coating liquid, and
a step of removing the medium from the film of the coating liquid, wherein
β as calculated by the following formula (I):

$$\beta = \{\text{amount (mol) of alkali metal in component } (A) - \text{amount (mol) of acidic dissociative group in component } (B)\}/\text{amount (mol) of acidic dissociative group in component } (C) \quad (I)$$

is more than 0.0 and not more than 0.90.

\* \* \* \* \*